(12) United States Patent
Barber et al.

(10) Patent No.: US 7,348,890 B2
(45) Date of Patent: Mar. 25, 2008

(54) PEST CONTROL TECHNIQUES

(75) Inventors: Daniel Barber, Coarsegold, CA (US); James King, Carmel, IN (US); Sterett Robertson, Thorntown, IN (US); Scott Ray, Carmel, IN (US); Malcolm Warren, Midland, MI (US); Anton Arnoldy, Brownsburg, IN (US); Mick A. Trompen, Westfield, IN (US); Stanley M. Gorgacz, Carmel, IN (US); Dennis Wujek, Zionsville, IN (US)

(73) Assignee: Dow AgroSciences LLC, Indianapolis, IN (US)

( * ) Notice: Subject to any disclaimer, the term of this patent is extended or adjusted under 35 U.S.C. 154(b) by 838 days.

(21) Appl. No.: 09/812,302

(22) Filed: Mar. 20, 2001

(65) Prior Publication Data

US 2001/0033230 A1 Oct. 25, 2001

Related U.S. Application Data

(63) Continuation of application No. PCT/US99/16519, filed on Jul. 21, 1999.

(51) Int. Cl.
*G08B 23/00* (2006.01)
(52) U.S. Cl. .............................. 340/573.2; 340/539.26; 340/572.5; 340/572.6; 340/572.7; 340/572.8; 43/107; 43/132.1
(58) Field of Classification Search ............. 340/573.2, 340/573.1, 870.16, 652, 572.1, 539.26, 572.5–572.8; 43/124, 132.1, 107, 133; 235/385; 73/587, 73/365.8; 324/239; 361/600, 748
See application file for complete search history.

(56) References Cited

U.S. PATENT DOCUMENTS 3,564,750 A 2/1971 Burgess ..................... 43/107

(Continued)

FOREIGN PATENT DOCUMENTS

EP 0 283 142 A1 9/1988

(Continued)

OTHER PUBLICATIONS

XP-002167430, Jennifer Jurgens, "*Development and Evaluation of an Inexpensive Sensor System for Use in Measuring Relative Finger Positions*", vol. 19, Medical Engineering & Physics, Elsevier Science Ltd., Oxford, England, Jan. 1997, abstract only.

(Continued)

*Primary Examiner*—Benjamin C. Lee
(74) *Attorney, Agent, or Firm*—Carl Corvin

(57) ABSTRACT

A pest control system (20) includes pest control devices (110) installed about an area or building (22). These devices (110) each include a bait member and a communication circuit. The communication circuit may be in the form of a passive RF tag that transmits information indicative of bait status and an identifier unique to each pest control device (110). A hand held interrogator (30) is provided to locate and communicate with the pest control devices (110) via the communication circuit. A data collection unit (40) to accumulate data gathered from the pest control devices (110) may alternatively or additionally be utilized. The bait member may be configured with a magnetic component to provide a magnetic signature indicative of the bait consumption behavior of targeted varieties of pest. The devices optionally include one or more environmental sensors to evaluate and predict pest behavior.

47 Claims, 14 Drawing Sheets

U.S. PATENT DOCUMENTS

| | | | | |
|---|---|---|---|---|
| 3,778,805 A | | 12/1973 | Gould | 340/541 |
| 3,836,842 A | * | 9/1974 | Zimmermann et al. | 324/239 |
| 4,105,971 A | * | 8/1978 | Nevalainen | 324/203 |
| 4,127,110 A | | 11/1978 | Bullara | 600/561 |
| 4,136,338 A | | 1/1979 | Antenore | 340/551 |
| 4,265,252 A | | 5/1981 | Chubbuck et al. | 600/561 |
| 4,366,644 A | | 1/1983 | Lawrence | 43/132.1 |
| 4,387,529 A | | 6/1983 | Hedstrom | |
| 4,455,441 A | | 6/1984 | Prestwich | 568/843 |
| 4,688,026 A | * | 8/1987 | Scribner et al. | 235/385 |
| 4,737,770 A | | 4/1988 | Brunius et al. | 340/539.22 |
| 4,737,789 A | | 4/1988 | Nysen | 342/51 |
| 4,862,145 A | | 8/1989 | Meehan et al. | 340/573.2 |
| 4,951,057 A | | 8/1990 | Nagel | 342/51 |
| 4,988,510 A | | 1/1991 | Brenner et al. | 424/84 |
| 5,024,832 A | * | 6/1991 | Omata et al. | 424/84 |
| 5,134,892 A | | 8/1992 | Wilson et al. | 73/866 |
| 5,209,233 A | | 5/1993 | Holland et al. | 600/412 |
| 5,285,688 A | | 2/1994 | Robbins et al. | 73/587 |
| 5,329,726 A | | 7/1994 | Thorne et al. | 43/124 |
| 5,428,345 A | | 6/1995 | Bruno | 340/541 |
| 5,429,735 A | | 7/1995 | Johnson et al. | 204/403.11 |
| 5,528,222 A | * | 6/1996 | Moskowitz et al. | 340/572.7 |
| 5,564,222 A | | 10/1996 | Brody | 43/124 |
| 5,571,967 A | | 11/1996 | Tanaka et al. | 73/587 |
| 5,575,105 A | | 11/1996 | Otomo | 43/132.1 |
| 5,592,774 A | * | 1/1997 | Galyon | 43/124 |
| 5,648,758 A | | 7/1997 | Tweadey, II et al. | 340/550 |
| 5,661,651 A | | 8/1997 | Geschke et al. | 701/88 |
| 5,739,514 A | | 4/1998 | Uchida | 235/435 |
| 5,764,138 A | * | 6/1998 | Lowe | 340/447 |
| 5,815,090 A | * | 9/1998 | Su | 340/870.16 |
| 5,864,241 A | | 1/1999 | Schreck et al. | 324/699 |
| 5,876,577 A | | 3/1999 | McAleer et al. | 205/777.5 |
| 5,877,422 A | * | 3/1999 | Otomo | 73/587 |
| 5,892,444 A | | 4/1999 | Wittmer et al. | 340/571 |
| 5,894,818 A | | 4/1999 | Betzen | 119/712 |
| 5,910,776 A | | 6/1999 | Black | 340/10.1 |
| 5,950,356 A | | 9/1999 | Nimocks | 43/131 |
| 5,974,344 A | | 10/1999 | Shoemaker, II | 607/149 |
| 5,974,726 A | * | 11/1999 | Creeger et al. | 43/107 |
| 5,986,570 A | | 11/1999 | Black et al. | 340/10.2 |
| 6,016,625 A | * | 1/2000 | Bishoff et al. | 43/121 |
| 6,025,725 A | * | 2/2000 | Gershenfeld et al. | 324/652 |
| 6,100,805 A | | 8/2000 | Lake | 340/573.1 |
| 6,111,520 A | * | 8/2000 | Allen et al. | 340/870.16 |
| 6,130,602 A | | 10/2000 | O'Toole | 340/10.33 |
| 6,150,944 A | * | 11/2000 | Martin et al. | 340/632 |
| 6,178,834 B1 | * | 1/2001 | Cates | 73/865.8 |
| 6,339,897 B1 | * | 1/2002 | Hayes et al. | 43/132.1 |
| 6,370,812 B1 | * | 4/2002 | Burns et al. | 43/124 |
| 6,397,516 B1 | * | 6/2002 | Su | 43/124 |
| 6,404,210 B1 | * | 6/2002 | Su | 324/692 |

FOREIGN PATENT DOCUMENTS

| | | |
|---|---|---|
| GB | 1 513 190 | 6/1978 |
| JP | 7-43460 | 2/1995 |
| JP | 9-26320 | 1/1997 |
| JP | 9-98701 | 4/1997 |
| JP | 10-56935 | 3/1998 |
| JP | 10056935 | 3/1998 |
| JP | 10-84834 | 4/1998 |
| JP | 10-105861 | 4/1998 |
| WO | WO 93/23998 | 12/1993 |
| WO | WO 98/46071 | 10/1998 |

OTHER PUBLICATIONS

XP-002167431, Miyauchi Shin'nosuke, Ohmiya Yukio, Yokotsuka Masatoshi, Ohkita Kumakazu, "*Electrical Properties of Carbon Black-Graft Polymers Crosslinked with Peroxide-Divinyl Monomer System*", vol. 25, J Soc Mater Sci Jpn, Oct. 1976, abstract only.

XP-002167432, RL Rosenbaum, "*Survey of Some Secondary Thermometers for Possible Applications At Very Low Temperatures*", vol. 41, Rev Sci Instrum, Jan. 1970, abstract only.

*Sentricon Colony Elimination System*; Mar. 26, 1999.

*Charge Transfer Sensing*; Hal Philipp; Copyright © 1997.

*Passive RFID Device with Sensor Input*; Microchip Technology Inc.; 1999.

* cited by examiner

PEST CONTROL TECHNIQUES

CROSS-REFERENCE TO RELATED APPLICATIONS

The present Application is a continuation of International Patent Application Number PCT/US99/16519 filed Jul. 21, 1999 and published in English on Feb. 1, 2001.

BACKGROUND

The present invention relates to pest control techniques, and more particularly, but not exclusively, relates to techniques for gathering data from a number of pest control devices spaced about an area to be protected from one or more types of pest.

Subterranean termites are a particularly troublesome type of pest with the potential to cause severe damage to wooden structures. Various schemes have been proposed to eliminate termites and certain other harmful pests of both the insect and noninsect variety. In one approach, pest control relies on the blanket application of chemical pesticides in the area to be protected. However, as a result of environmental regulations, this approach is becoming less desirable.

Recently, advances have been made to provide for the targeted delivery of pesticide chemicals. U.S. Pat. No. 5,815,090 to Su is one example. Another example directed to termite control is the SENTRICON™ system of Dow AgroSciences that has a business address of 9330 Zionsville Road, Indianapolis, Ind. In this system, a number of units each having a termite edible material are placed in the ground about a dwelling to be protected. The units are inspected routinely by a pest control service for the presence of termites, and inspection data is recorded with reference to a unique barcode label associated with each unit. If termites are found in a given unit, a bait is installed that contains a slow-acting pesticide intended to be carried back to the termite nest to eradicate the colony.

Unfortunately, these units are sometimes difficult to locate after installation, resulting in excessive time spent in inspection activities. For metallic units, metal detection equipment might be utilized to speed-up unit location; however, a significant number of buried metal objects are typically found in the vicinity of houses and other structures that would hamper unit detection in this manner. Moreover, it may be desirable to make the units from nonmetallic materials to such an extent that they are not readily locatable with metal detection equipment.

Furthermore, alternative techniques for gathering data relating to pest activity are desired. For instance, it is desirable to reduce the amount of time required for data gathering by pest control services. Also, it is desirable to enhance the reliability of data gathering techniques and to obtain more comprehensive pest activity data.

SUMMARY OF THE INVENTION

One form of the present invention includes a unique pest control technique. In another form, a unique pest control device to detect and exterminate one or more selected species of pest is provided. As used herein, a "pest control device" refers broadly to any device that is used to sense, detect, monitor, bait, feed, poison, or exterminate one or more species of pest. In still another form, a unique pest control device locating technique is provided.

A further form of the present invention includes a unique pest control system. This system includes a number of pest control devices and an interrogator to gather data from the pest control devices. The interrogator may be in a hand-held form configured to individually establish wireless communication with each of the pest control devices.

Another form of the present invention includes a pest control device that has a unique wireless communication capability, such as a passive RF communication circuit responsive to a stimulation signal. This device may optionally include an active wireless communication circuit.

Yet another form of pest control device of the present invention includes a communication circuit that provides a signal to uniquely identify the device. Furthermore, the communication circuit may transmit a signal indicative of pest activity associated with the device.

In an alternative form of the present invention, a pest control device includes a unique monitoring bait that is at least partially comprised of a magnetic material. In a further alternative, a pest control device includes one or more environmental sensors to gather data about one or more corresponding environmental characteristics.

Additional forms, embodiments, aspects, features, and objects of the present invention shall become apparent from the drawings and description contained herein.

DESCRIPTION OF THE PREFERRED EMBODIMENTS

Figure 1:
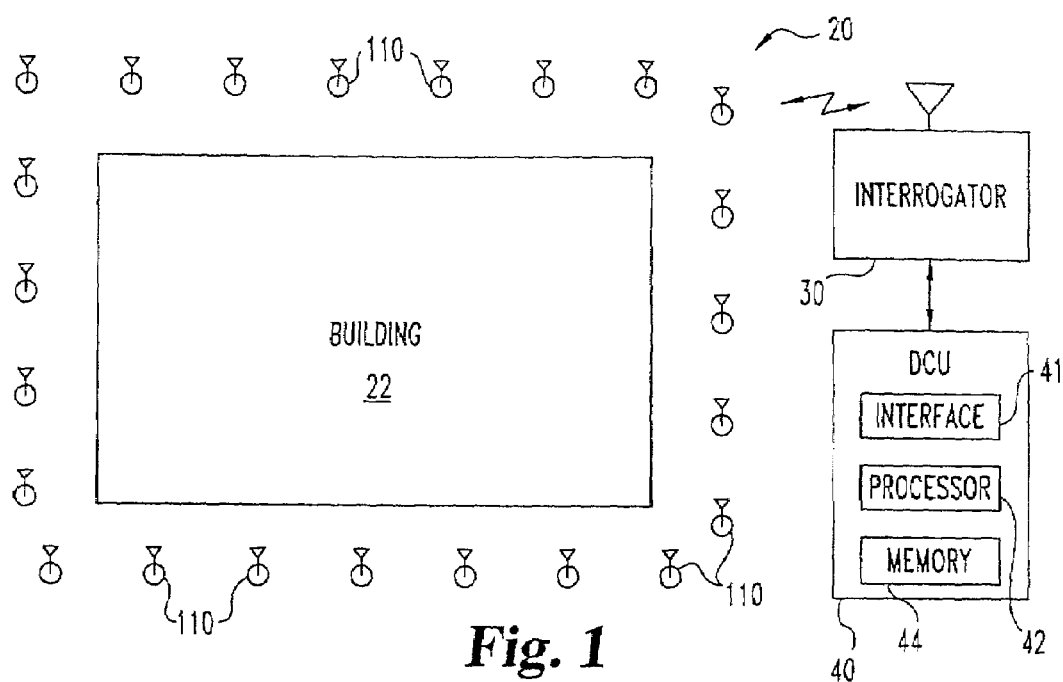
FIG. 1 is a diagrammatic view of a first type of pest control system according to the present invention.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

FIG. 1 illustrates pest control system 20 of one embodiment of the present invention. System 20 is arranged to protect building 22 from damage due to pests, such as subterranean termites. System 20 includes a number of pest control devices 110 positioned about building 22. In FIG. 1, only a few of devices 110 are specifically designated by reference numerals to preserve clarity. System 20 also includes interrogator 30 to gather information about devices 110. Data gathered from devices 110 with interrogator 30 is collected in Data Collection Unit (DCU) 40 through communication interface 41.

Figure 2:
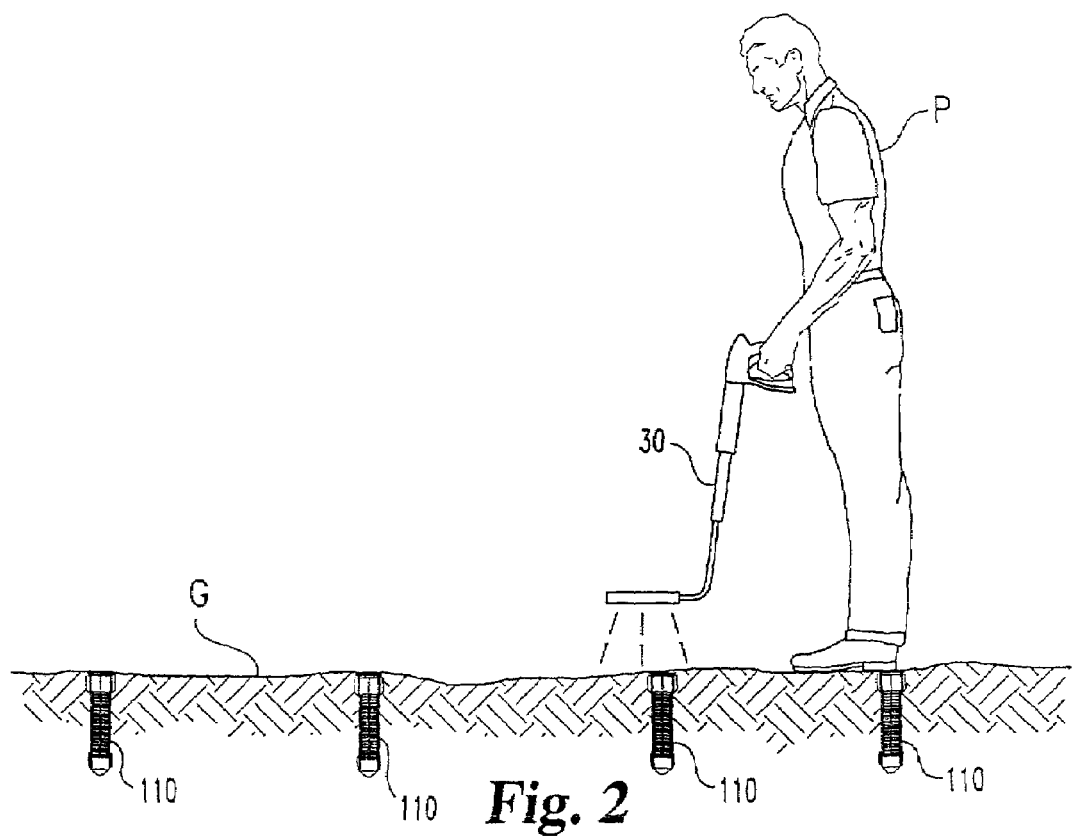
FIG. 2 is a view of selected elements of the system of FIG. 1 in operation.

Referring additionally to FIG. 2, certain aspects of the operation of system 20 are illustrated. In FIG. 2, a pest control service provider P is shown operating interrogator 30 to interrogate pest control devices 110 located at least partially below ground G using a wireless communication technique. In this example, interrogator 30 is shown in a hand-held form convenient for sweeping over ground G to establish wireless communication with installed devices 110. Additional aspects of system 20 and its operation are described in connection with FIGS. 5 and 6, but first further details concerning a representative pest control device 110 are described with reference to the exploded assembly views of FIGS. 3 and 4.

Figure 3:
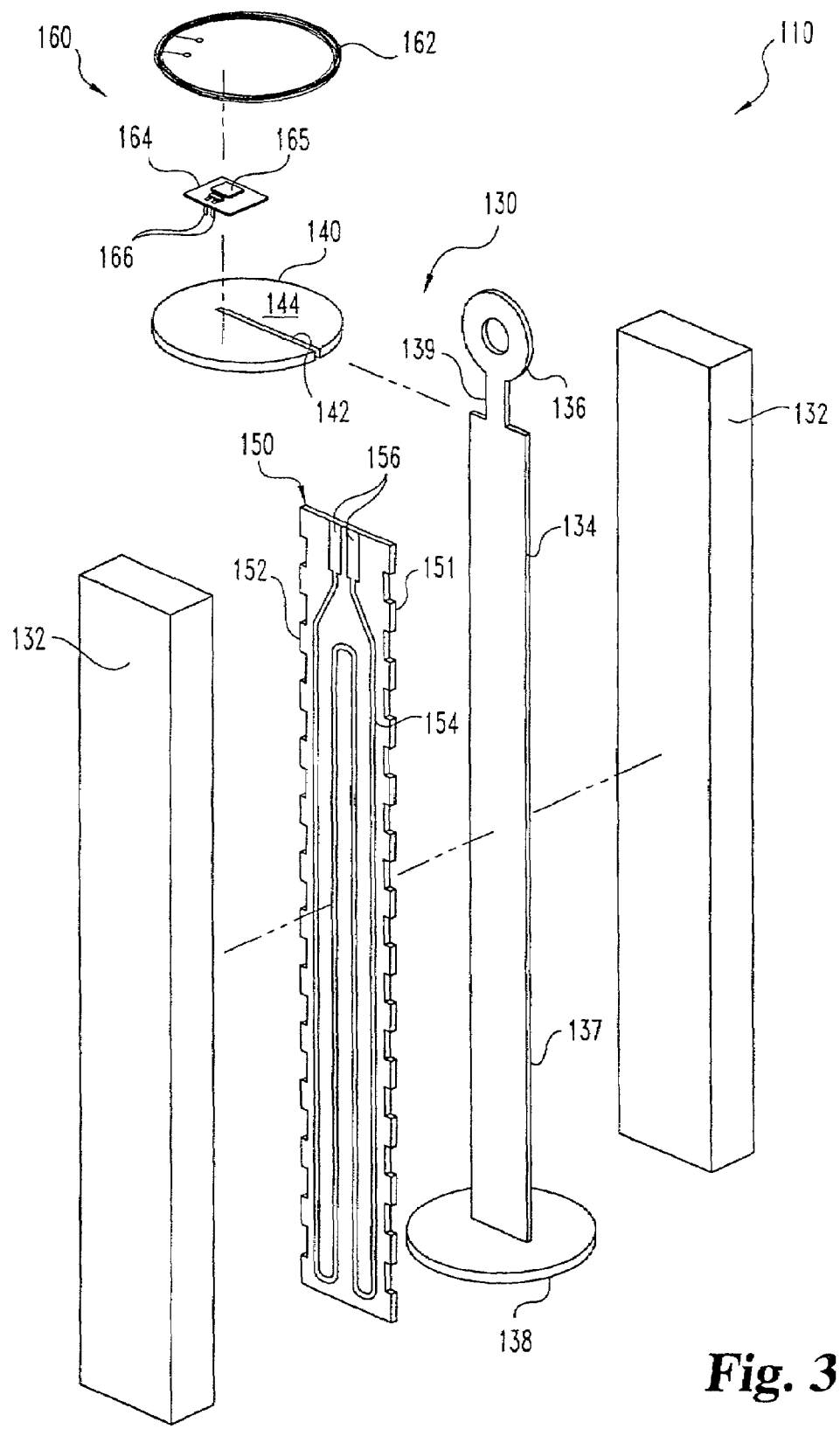
FIGS. 3 and 4 are exploded assembly views of a first type of pest control device according to the present invention that may be used in the system of FIG. 1 to monitor pest activity.
Figure 4:
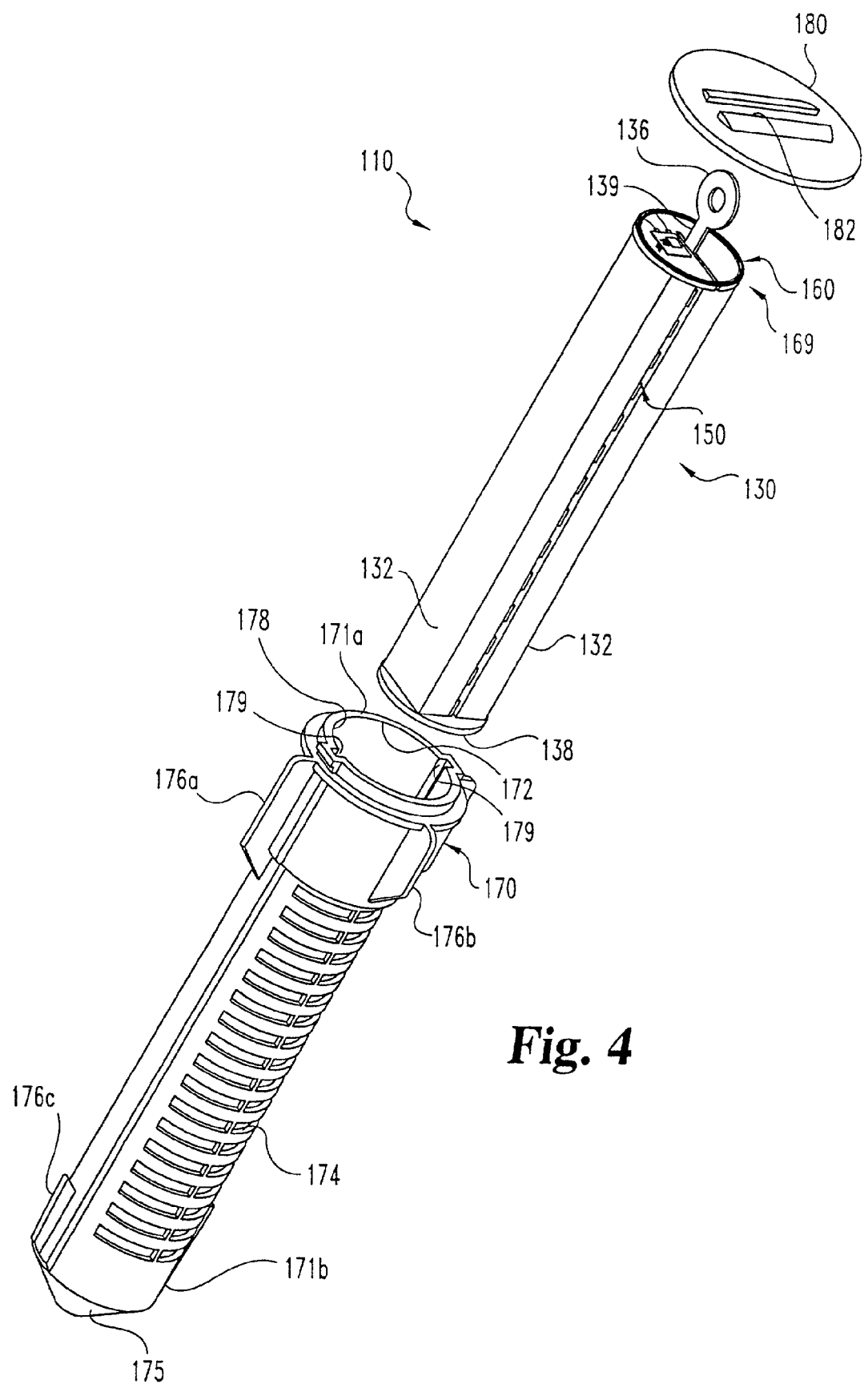

As shown in FIGS. 3 and 4, pest control device 110 includes pest activity monitoring assembly 130. Monitoring assembly 130 includes two bait members 132 each made from a bait material for one or more selected species of pest. For example, bait members 132 may each be made of a material that is a favored food of such pests. In one example directed to subterranean termites, bait members 132 are each in the form of a soft wood block without a pesticide component. In other examples for termites, bait members 132 may initially include a pesticide, have a composition other than wood, or a combination of these features. In still other examples where pest control device 110 is directed to a type of pest other than termites, a correspondingly different composition of bait members 132 is typically used.

Monitoring assembly 130 also includes support member 134. Support member 134 includes handle 136 connected to base 138 by elongated central connecting portion 137. Support member 134 also includes neck 139 between portion 137 and handle 136. Typically, support member 134 is made of a material that is not significantly consumed or displaced by pests to which monitoring assembly 130 is likely to be exposed. In one example directed to subterranean termites, support member 134 is formed from a polymeric resin compound, such as polypropylene.

Monitoring assembly 130 further includes pest sensor 150. Pest sensor 150 includes sensing member 151 positioned between one of bait members 132 and support member 134. Sensing member 151 includes substrate 152 carrying electrically conductive pathway 154. Pathway 154 terminates in two electrically isolated contacts 156. Substrate 152 of member 151 is formed from a material that is arranged to be consumed or otherwise displaced by feeding pests. As a result of consumption and/or displacement of substrate 152 by one or more pests, electrical continuity of pathway 154 is eventually disrupted. This disruption may be utilized as an indicator of pest presence. Alternatively, substrate 152 may be oriented with respect to bait members 132 so that a certain degree of consumption of bait members 132 exerts a force sufficient to open electrically conductive pathway 154. In one example that has been found to be suitable for subterranean termites, substrate 152 is made of a non-food substrate, such as closed cell foam which is readily displaced by termites, and electrically conductive pathway 154 is defined by a conductive material applied to substrate 152. In another example, substrate 152 may include one or more types of material favored as a food by targeted pests. In still other examples, a combination of food and non-food materials may be utilized.

Pest sensing member 151 is positioned against one side of support member 134 with one of bait members 132 positioned against the other side. The remaining bait member 132 is positioned against the side of pest sensing member 151 opposite the side in contact with support member 134. Bait members 132, pest sensing member 151, and support member 134 may be bonded together by an adhesive or coupled together by another method as would occur to those skilled in the art.

Monitoring assembly 130 also includes support disk 140. Support disk 140 defines slot 142 to engage neck 139 of support member 134 and retain bait members 132 and sensing member 151 between base 138 and disk 140. Typically, disk 140 is also made from a material that is not substantially consumed or displaced by pests to which monitoring assembly 130 is to be exposed. Disk 140 defines surface 144.

Surface 144 of disk 140 supports circuit substrate 164 of monitoring assembly 130. Wireless communication circuit 160 is defined by a number of components 165 mounted on substrate 164. Components 165 include antenna coil 162 operable in the Radio Frequency (RF) range and one or more other components electrically coupled to coil 162. Communication circuit 160 includes a pair of conductors 166 that each electrically couple with a respective one of contacts 156 of sensor 150 to form an electrically conductive loop with pathway 154. Collectively, communication circuit 160 and pathway 154 of sensor 150 are designated as pest monitoring circuitry 169 which is more fully described in connection with FIG. 5 hereinafter.

First referring more specifically to FIG. 4, pest control device 110 also includes housing 170. Housing 170 has end portion 171a opposite end portion 171b. End portion 171b includes tapered end 175 to assist with placement of device 110 in the ground as illustrated in FIG. 2. End 175 terminates in an aperture (not shown). Housing 170 defines chamber 172 to receive pest activity monitoring assembly 130 through an opening 178 defined by end portion 171a. Also in communication with chamber 172 are a number of slots 174 defined by housing 170. Slots 174 are arranged to permit the ingress and egress of termites from chamber 172. Housing 170 has a number of protruding flanges, a few of which are designated by reference numerals 176a, 176b, 176c in FIG. 4, to assist with positioning of device 110 in the ground.

Cap 180 is arranged to secure monitoring assembly 130 in chamber 172. Cap 180 may include prongs (not shown) to removably engage the structure defined by housing 170, such as channels 179. Typically, housing 170 and cap 180 are made of a material resistant to damage by the pests and the environment to which device 110 is to be exposed. In one example suitable for subterranean termites, housing 170 and cap 180 are made of a thermoset or thermoplastic polymeric resin.

Figure 5:
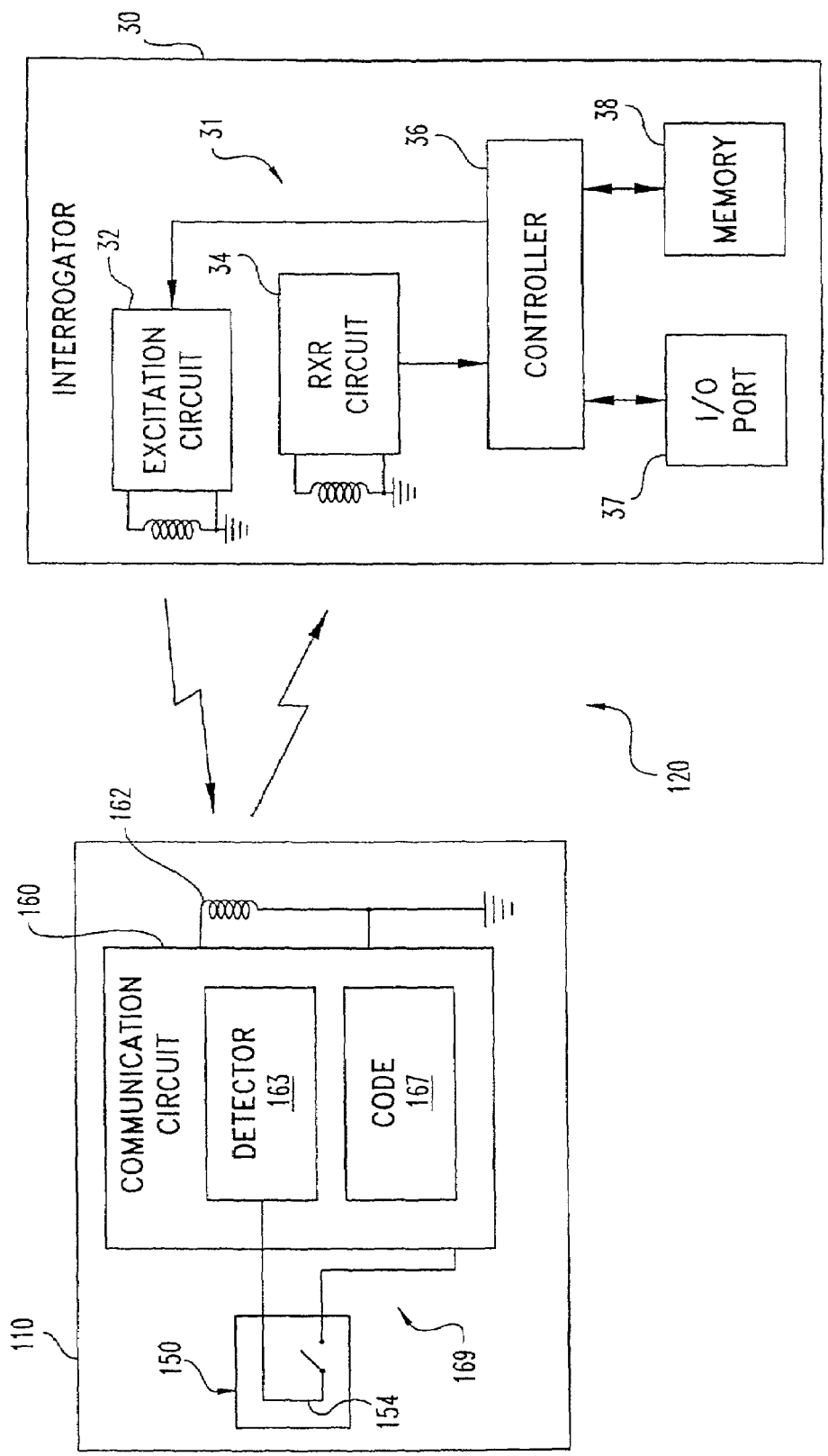
FIG. 5 is a diagram of selected circuitry of the system of FIG. 1.

FIG. 5 further illustrates monitoring circuitry 169 of device 110 and communication circuitry 31 of interrogator 30 alternatively designated as wireless communication subsystem 120. Included in circuitry 169 of subsystem 120 is communication circuit 160. Communication circuit 160 defines sensor state detector 163 that is electrically coupled to pathway 154 of sensor 150. Pathway 154 is schematically represented as a switch in FIG. 5. Accordingly, sensor state detector 163 is operable to provide a two-state status signal when energized; where one state represents an open or electrically broken pathway 154 and the other state represents an electrically closed or continuous pathway 154. Communication circuit 160 also includes identification code 167 to generate a corresponding identification signal for device 110. Identification code 167 may be in the form of a predetermined multibit binary code or such other form as would occur to those skilled in the art. In one embodiment, identification code 167 is defined by a set of integrated circuit fuses programmed at the time of manufacture. In another embodiment, identification code 167 is defined by a set of adjustable microswitches. Detector 163, code 167, or both may be integral subcircuits of communication circuit 160 or otherwise configured as would occur to those skilled in the art.

Communication circuit 160 is operable as a passive RF transponder that is energized by an external stimulation or excitation signal. Likewise, detector 163 and code 167 features of circuit 160 are powered by this stimulation signal. In response to being energized by a stimulation signal, communication circuit 160 transmits information in a modulated RF format corresponding to the bait status determined with detector 163 and the device identifier determined with identification code 167. U.S. Pat. No. 5,764,138 to Lowe provides additional background information regarding passive RF tag technology that may be utilized to provide communication circuit 160, and is hereby incorporated by reference in its entirety. In one embodiment, communication circuit 160 is integrated on a single semiconductor chip. For example, integrated circuit model number MCRF-202 supplied by Microchip Technologies Inc., with a business address of: 2355 West Chandler Blvd., Chandler, Ariz. 85224-6199 may be utilized to provide communication circuit 160. In other embodiments, different arrangements of one or more components may be utilized to collectively or separately provide communication circuit 160.

In an alternative configuration, communication circuit 160 may transmit only a bait status signal or an identification signal, but not both. In a further embodiment, different variable information about device 110 may be transmitted with or without bait status or device identification information. In another alternative, communication circuit 160 may be selectively or permanently "active" in nature, having its own internal power source. In yet another alternative embodiment, device 110 may include both active and passive circuits.

Subsystem 120 of FIG. 5 also illustrates communication circuitry 31 of interrogator 30. Interrogator 30 includes RF excitation circuit 32 and RF receiver (RXR) circuit 34 each operatively coupled to controller 36. While interrogator 30 is shown with separate coils for circuits 32 and 34, the same coil may be used for both in other embodiments. Controller 36 is operatively coupled to Input/Output (I/O) port 37 and memory 38 of interrogator 30. Interrogator 30 has its own power source (not shown) to energize circuitry 31 that is typically in the form of an electrochemical cell, or battery of such cells (not shown). Controller 36 may be comprised of one or more components. In one example controller 36 is a programmable microprocessor-based type that executes instructions loaded in memory 38. In other examples, controller 36 may be defined by analog computing circuits, hardwired state machine logic, or other device types as an alternative or addition to programmable digital circuitry. Memory 38 may include one or more solid-state semiconductor components of the volatile or nonvolatile variety. Alternatively or additionally, memory 38 may include one or more electromagnetic or optical storage devices such as a floppy or hard disk drive or a CD ROM. In one example, controller 36, I/O port 37, and memory 38 are integrally provided on the same integrated circuit chip.

I/O port 37 is configured to send data from interrogator 30 to data collection unit 40 as shown in FIG. 1. Referring back to FIG. 1, further aspects of data collection unit 40 are described. Interface 41 of unit 40 is configured for communicating with interrogator 30 via I/O port 37. Unit 40 also includes processor 42 and memory 44 to store and process information obtained from interrogator 30 about devices 110. Processor 42 and memory 44 may be variously configured in an analogous manner to that described for controller 36 and memory 38, respectively. Further, interface 41, processor 42, and memory 44 may be integrally provided on the same integrated circuit chip.

In one embodiment, unit 40 is provided in the form of a laptop personal computer adapted to interface with interrogator 30 and programmed to receive and store data from interrogator 30. In another embodiment, unit 40 may be remotely located relative to interrogator 30. For this embodiment, one or more interrogators 30 communicate with unit 40 over an established communication medium like the telephone system or a computer network like the internet. In still other embodiments, different interface and communication techniques may be used with interrogator 30, data collection unit 40, and devices 110 as would occur to those skilled in the art.

Referring generally to FIGS. 1-5, certain operational aspects of system 20 are further described. Typically, interrogator 30 is arranged to cause excitation circuit 32 to generate an RF signal suitable to energize circuitry 169 of device 110 when device 110 is within a predetermined distance range of interrogator 30. In one embodiment, controller 36 is arranged to automatically prompt generation of this stimulation signal on a periodic basis. In another embodiment, the stimulation signal may be prompted by an operator through an operator control coupled to interrogator 30 (not shown). Such operator prompting may be either as an alternative to automatic prompting or as an additional prompting mode. Interrogator 30 may include a visual or audible indicator of a conventional type (not shown) to provide interrogation status to the operator as needed.

Device 110 transmits bait status and identifier information to interrogator 30 when interrogator 30 transmits a stimulation signal to device 110 within range. RF receiver circuit 34 of interrogator 30 receives the information from device 110 and provides appropriate signal conditioning and formatting for manipulation and storage in memory 38 by controller 36. Data received from device 110 may be transmitted to data collection unit 40 by operatively coupling I/O port 37 to interface 41.

Figure 6:
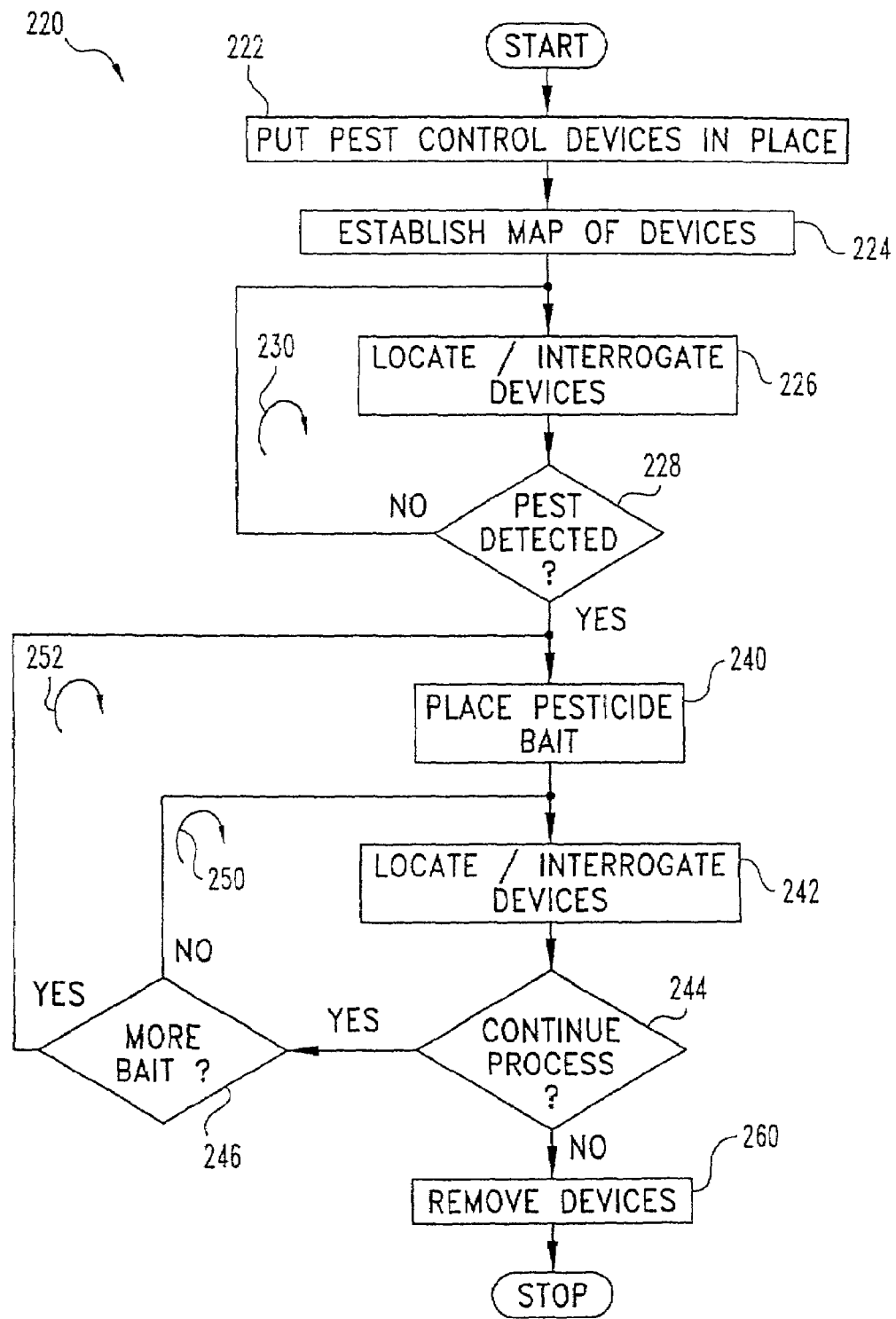
FIG. 6 is a flowchart of one example of a process of the present invention that may be performed with the system of FIG. 1.

Referring further to the flowchart of FIG. 6, termite control process 220 of a further embodiment of the present invention is illustrated. In stage 222 of process 220, a number of pest control devices 110 are installed in a spaced apart relationship relative to an area to be protected. By way of nonlimiting example, FIG. 1 provides a diagram of one possible distribution of a number of devices 110 arranged about building 22 to be protected. One or more of these devices can be at least partially placed below ground as illustrated for a few of devices 110 in FIG. 2.

For process 220, devices 110 are initially installed with bait members 132 being of a monitoring variety that are favored as a food by subterranean termites and does not include a pesticide. It has been found that once a colony of termites establish a pathway to a food source, they will tend to return to this food source. Consequently, devices 110 are initially placed in a monitoring configuration to establish such pathways with any termites that might be in the vicinity of the area or structures desired to be protected, such as building 22.

Once in place, a map of devices 110 is generated in stage 224. This map includes indicia corresponding to the coded identifiers for installed devices 110. In one example, the identifiers are unique to each device 110. Pest monitoring loop 230 of process 220 is next encountered with stage 226. In stage 226, installed devices 110 are periodically located and data is loaded from each device 110 by interrogation of the respective wireless communication circuit 160 with interrogator 30. This data corresponds to bait status and identification information. In this manner, pest activity in a given device 110 may readily be detected without the need to extract or open each device 110 for visual inspection. Further, such wireless communication techniques permit the establishment and building of an electronic data base that may be downloaded into data collection device 40 for long term storage.

It should also be appreciated that over time, subterranean pest monitoring devices 110 may become difficult to locate as they have a tendency to migrate, sometimes being pushed further underground. Moreover, in-ground monitoring devices 110 may become hidden by the growth of surrounding plants. In one embodiment, interrogator 30 and multiple devices 110 are arranged so that interrogator 30 only communicates with the closest device 110. This technique may be implemented by appropriate selection of the communication range between interrogator 30 and each of devices 110 and the position of devices 110 relative to each other. Accordingly, interrogator 30 may be used to scan or sweep a path along the ground to consecutively communicate with each individual device 110. For such embodiments, the wireless communication subsystem 120 provided by interrogator 30 with each of devices 110 provides a procedure and means to more reliably locate a given device 110 after installation as opposed to more limited visual or metal detection approaches. Indeed, this localization procedure may be utilized in conjunction with the unique identifier of each device and/or the map generated in stage 224 to more rapidly service a site in stage 226. In a further embodiment, the locating operation may be further enhanced by providing an operator-controlled communication range adjustment feature for interrogator 30 (not shown) to assist in refining the location of a given device. Nonetheless, in other embodiments, devices 110 may be checked by a wireless communication technique that does not include the transmission of identification signals or a coordinating map. Further, in alternative embodiments, localization of devices 110 with interrogator 30 may not be desired.

Process 220 next encounters conditional 228. Conditional 228 tests whether any of the status signals, corresponding to a broken pathway 154, indicate termite activity. If the test of conditional 228 is negative, then monitoring loop 230 returns to stage 226 to again monitor devices 110 with interrogator 30. Loop 230 may be repeated a number of times in this fashion. Typically, the rate of repetition of loop 230 is on the order of a few days or weeks and may vary. If the test of conditional 228 is affirmative, then process 220 continues with stage 240. In stage 240, the pest control service provider places a pesticide laden bait in the vicinity of the detected pests. In one example, pesticide placement includes the removal of cap 180 by the service provider and extraction of pest activity monitoring assembly 130 by handle 136 from housing 170. Next, a replacement device is installed that may be substantially identical to pest activity monitoring assembly 130, except bait members 132 include a pesticide. Cap 180 is then engaged to housing 170 to secure the new assembly in chamber 172. This approach reconfigures device 110 from a monitoring to an exterminating mode of operation.

In other embodiments, the replacement device may include a different configuration of communication circuit or lack a communication circuit entirely. In another alternative, the pesticide is added to the existing pest sensing device by replacing one or more of the bait members 132, and optionally, sensor 150. In still another embodiment, pesticide bait or other material is added with or without the removal of monitoring assembly 130. In yet a further embodiment, pesticide is provided in a different device that is installed adjacent to the installed device 110 with pest activity. During the pesticide placement operation of stage 240, it is desirable to return or maintain as many of the termites as possible in the vicinity of the device 110 where the pest activity was detected so that the established pathway to the nest may serve as a ready avenue to deliver the pesticide to the other colony members.

After stage 240, monitoring loop 250 is encountered with stage 242. In stage 242, devices 110 continue to be periodically checked. In one embodiment, the inspection of devices 110 corresponding to pesticide bait is performed visually by the pest control service provider while the inspection of other devices 110 in the monitoring mode ordinarily continues to be performed with interrogator 30. In other embodiments, visual inspection may be supplemented or replaced by electronic monitoring using the pest activity monitoring assembly 130 configured with poisoned bait members 132, or a combination of approaches may be performed. In one alternative, pathway 154 is altered to monitor pesticide baits such that it is typically not broken to provide an open circuit reading until a more substantial amount of bait consumption has taken place relative to the pathway configuration for the monitoring mode. In still other alternatives, the pesticide bait may not ordinarily be inspected—instead being left alone to reduce the risk of disturbing the termites as they consume the pesticide.

After stage 242, conditional 244 is encountered that tests whether process 220 should continue. If the test of conditional 244 is affirmative—that is process 220 is to continue—then conditional 246 is encountered. In conditional 246, it is determined if more pesticide bait needs to be installed. More bait may be needed to replenish consumed bait for devices where pest activity has already been detected, or pesticide bait may need to be installed in correspondence with newly discovered pest activity for devices 110 that remained in the monitoring mode. If the conditional 246 test is affirmative, then loop 252 returns to stage 240 to install additional pesticide bait. If no additional bait is needed as determined via conditional 246, then loop 250 returns to repeat stage 242. Loops 250, 252 are repeated in this manner unless the test for conditional 244 is negative. The repetition rate of loops 250, 252 and correspondingly the interval between consecutive performances of stage 242, is on the order of a few days or weeks and may vary. If the test of conditional 244 is negative, then devices 110 are located and removed in stage 260 and process 220 terminates.

In one alternative process, monitoring for additional pest activity in stage 242 may not be desirable. Instead, the monitoring units may not be interrogated, or may be removed as part of stage 242. In another alternative, devices 110 configured for monitoring mode may be redistributed, increased in number, or decreased in number.

Figure 7:
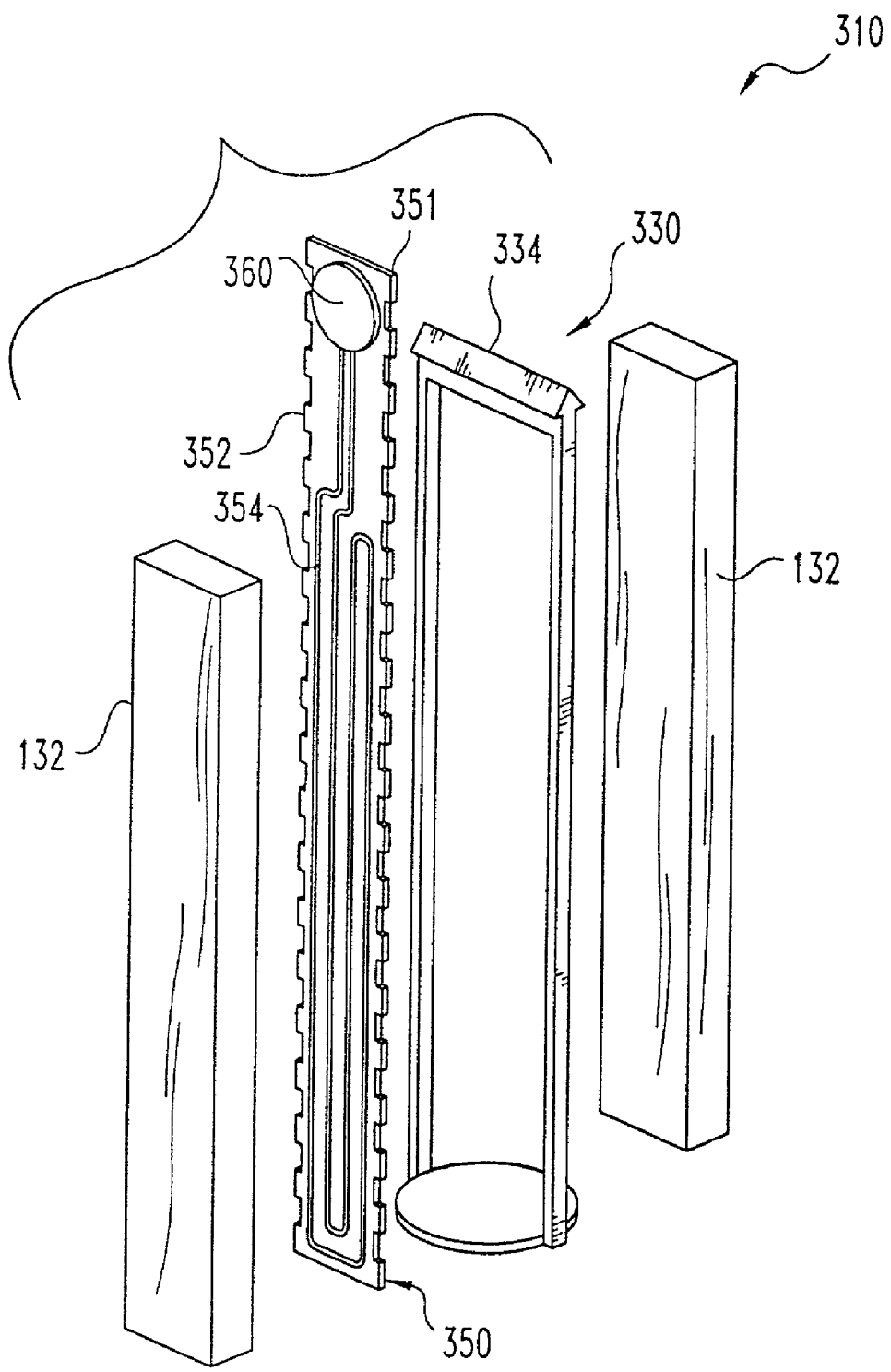
FIGS. 7 and 8 are exploded assembly views of a second type of pest control device according to the present invention.
Figure 8:
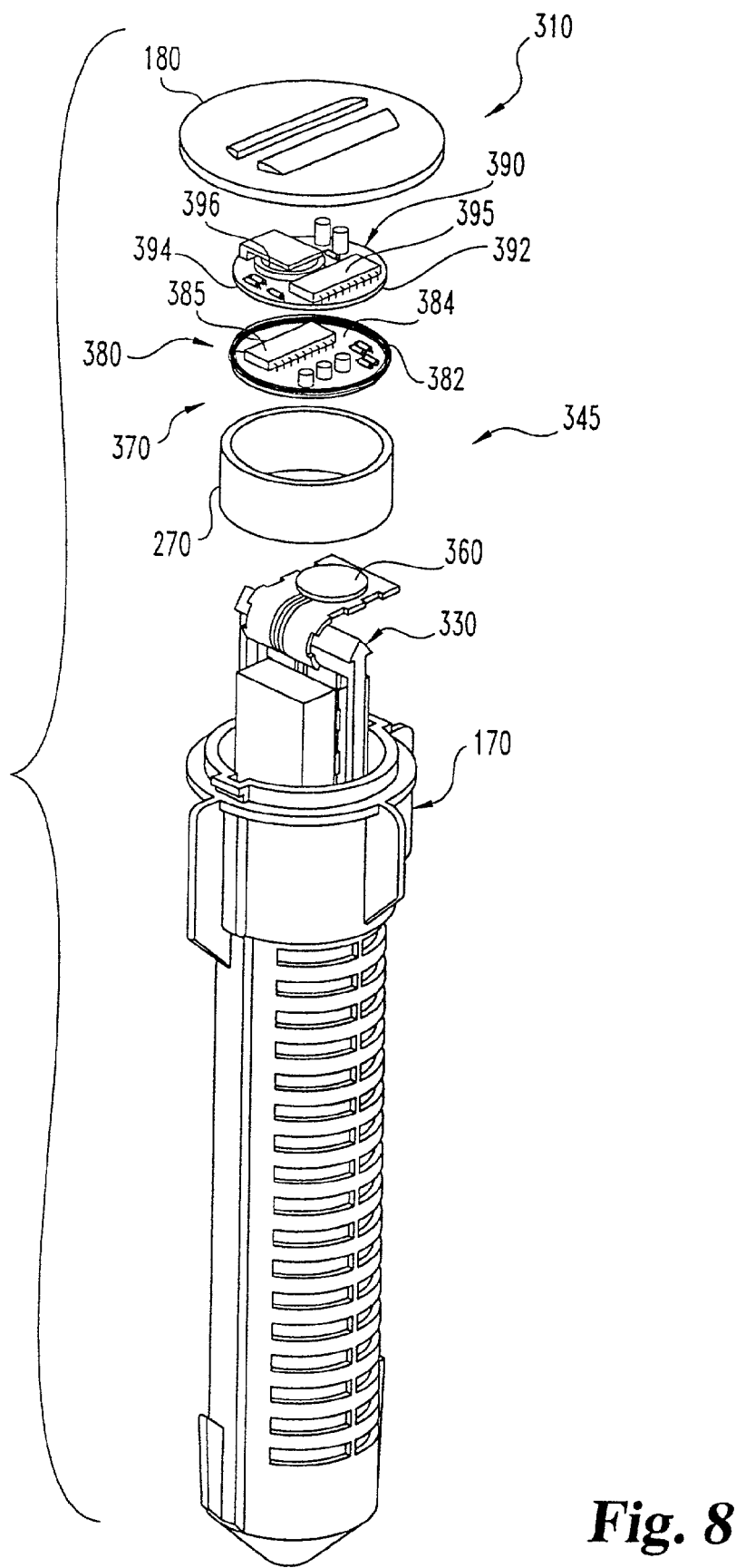

FIGS. 7 and 8 illustrate pest control device 310 of another alternative embodiment of the present invention, where like reference numerals refer to like features previously described in connection with FIGS. 1-6. Device 310 includes passive sensing device 330. Sensing device 330 includes two bait members 132 as previously described, support member 334, sensor 350 with sensing member 351, and passive RF transponder 360. Members 334, 351 are arranged for assembly between bait members 132 in a manner analogous to the assembly of members 134, 151 between bait members 132 as previously described for monitoring assembly 130 in connection with FIGS. 3 and 4.

Sensing member 351 includes substrate 352 and conductive pathway 354. Pathway 354 is coupled to substrate 352 and may be readily broken to produce an open circuit in the manner described for pathway 154 of assembly 130. Pathway 354 is electrically connected to passive RF transponder 360 to form a closed, electrically conductive loop prior to disruption by pests. Transponder 360 may be configured the same as wireless communication circuit 160. Transponder 360 is shown in FIGS. 7 and 8 in an encapsulated form integral with sensor 350.

Referring specifically to FIG. 8, sensing device 330 is shown installed in housing 170. In addition, circuit housing 270 is shown that fits around transponder 360. Device 310 further includes active circuitry 370. Circuitry 370 includes interrogation circuitry 380 and active wireless communication circuit 390. Interrogation circuitry 380 includes antenna coil 382 wound about the perimeter of circuit substrate 384. Interrogation circuitry 380 is comprised of components 385, including coil 382, mounted to substrate 384. Communication circuit 390 is in the form of a transmitter/receiver (TXR/RXR) and is electrically coupled to interrogation circuitry 380. Communication circuit 390 is comprised of components 395 mounted on substrate 394. Components 395 include an electrical power source 396, such as a button-shaped electrochemical cell, or battery of such cells. Communication circuit 390 may include a separate antenna or use one or more antennae of interrogation circuitry 380. It should be appreciated that components 385, 395 of device 310 shown in FIG. 8 are intended to be merely representative, and may include more or fewer components that may be different in appearance.

Substrates 384, 394 are assembled in a stacked arrangement in housing 270 over transponder 360 of sensing device 330. Collectively, pest sensing device 330 (including transponder 360) and active circuitry 370 define monitoring device 345. Cap 180, operates as previously described to removably enclose monitoring device 345 within housing 170.

Figure 9:
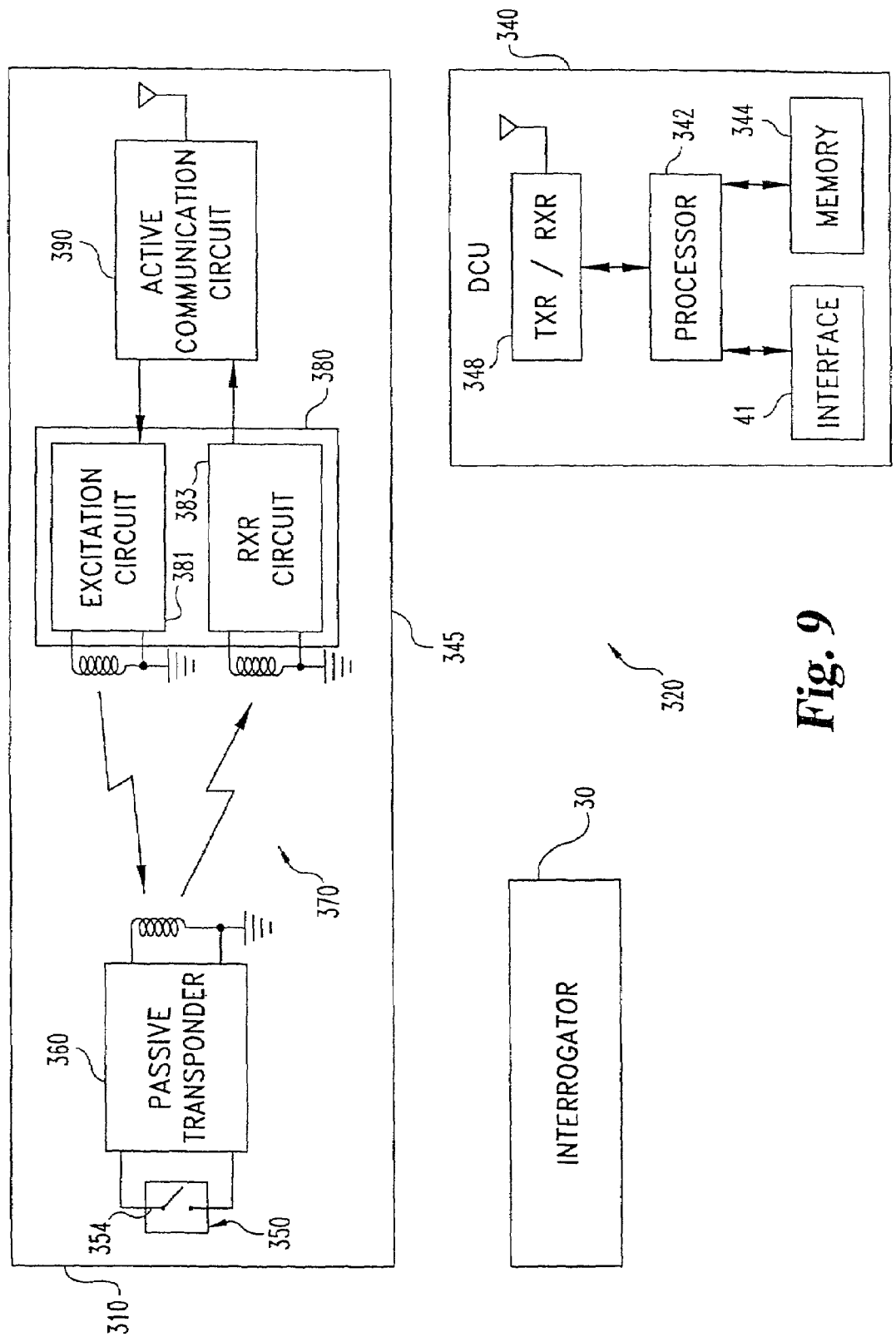
FIG. 9 is block diagram of a second type of pest control system according to the present invention that includes the pest control device of FIGS. 7 and 8.

Referring to FIG. 9, communication system 320 of another embodiment of the present invention is shown in a block diagram form; where previously described reference numerals refer to like features. System 320 includes interrogator 30 as previously described, monitoring device 345 of a representative pest control device 310, and data collection unit 340. Transponder 360 is coupled to pathway 354 of sensor 350 schematically represented by a switch to provide a pest activity sensing loop in the manner described for monitoring assembly 130. Interrogation circuitry 380 includes an excitation circuit 381 and receiver (RXR) circuit 383. Circuits 381 and 383 may be configured comparable to circuits 32, 34 of interrogator 30. Likewise, while circuits 381, 383 are each shown with a different coil, a common coil may be used in other embodiments. Circuitry 380 is energized by the internal power source 396 of active wireless communication circuit 390 (see FIG. 8). Circuitry 380, communication circuit 390, or both may include a controller or other logic to perform the operation of device 310 described hereinafter.

Data collection device 340 includes an active transmitter/receiver 348 operatively coupled to processor 342. Processor 342 is operatively coupled to memory 344. Processor 342 and memory 344 may be the same as processor 42 and memory 44 of system 20, respectively. Data collection unit 340 also includes interface 41 as previously described, to interface with I/O port 37 of interrogator 30. In one embodiment, data collection unit 340 is in the form of a custom processing unit provided to pest control services to collect data from a number of units 310. In another embodiment, data collection unit 340 is provided in the form of a laptop computer with one or more custom components installed to provide the indicated features.

Referring generally to FIGS. 7-9, one process for operating system 320 includes installing a number of pest control devices 310 in the manner described for devices 110. Once installed, devices 310 are arranged to be interrogated in a number of modes. In one mode, passive transponder 360 is stimulated with interrogator 30 as described for device 110. Accordingly, interrogator 30 receives information representative of a device identifier and bait status. This information may be downloaded from interrogator 30 into data collection unit 40 or 340.

In another mode of operation, transponder 360 is interrogated by interrogation circuitry 380 on-board device 310. For this mode, interrogation is initiated when data control unit 340 sends an interrogation command to communication circuit 390 of device 345 from transmitter/receiver 348. Transmitter/receiver 348 is capable of sending commands specific to each device 310, and communication circuit 390 of a given device 310 is configured to ignore commands for other devices 310 and respond to its own commands. These commands may be determined in accordance with identification codes specific to each transponder 360 of devices 310.

Once communication circuit 390 receives an appropriate command, it activates the corresponding excitation circuit 381 to generate an RF stimulation signal. This stimulation signal energizes passive transponder 360 to send bait status and identification information via an RF transmission. Receiver circuit 383 receives the transmission from transponder 360, and sends it to communication circuit 390. Communication circuit 390 receives the information sent by receiver circuit 383 and retransmits it to data collection unit 340 in the form of an RF communication. Transmitter/receiver 348 receives the information transmitted from device 310. Transmitter/receiver 348 converts the information from its RF format to a format suitable for manipulation by processor 342 and storage in memory 344. As used herein, a transmitter/receiver (TXR/RXR) broadly refers to transmitters and receivers that have one or more circuit components in common, such as a transceiver, or that are provided as independent transmitting and receiving circuits, respectively.

Figure 10:
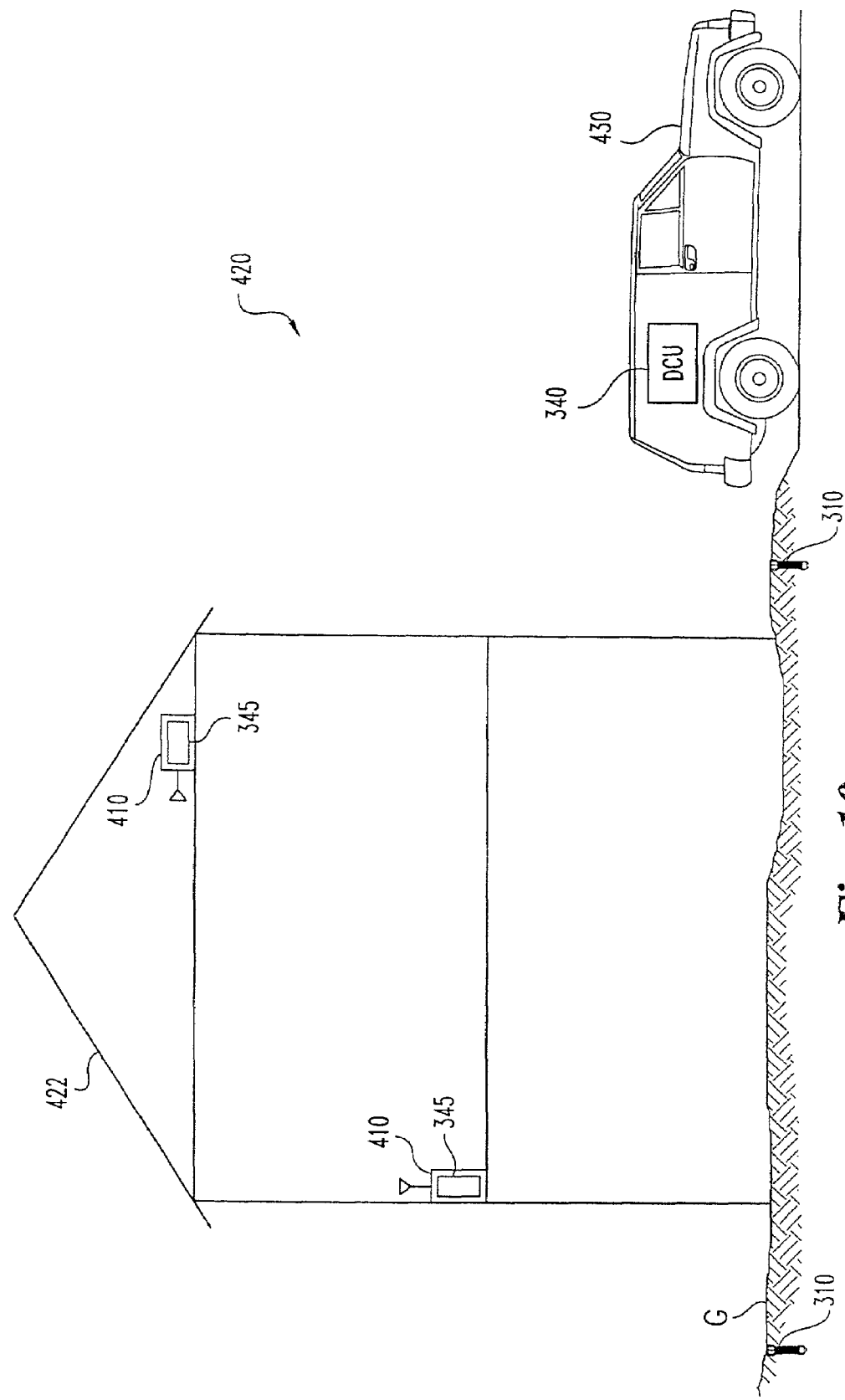
FIG. 10 is a diagram of a third type of pest control system according to the present invention that includes the pest control device of FIGS. 7 and 8.

Referring to FIG. 10, system 420 of yet another embodiment of the present invention is illustrated; where like reference numerals previously described refer to like features. System 420 includes a number of devices 310 installed in the ground G and a number of above ground units 410 to protect building 422 as diagrammatically depicted in FIG. 10. Each unit 410 includes device 345 in a different housing more suitable for placement in building 422 as compared to housing 170. System 420 further includes vehicle 430 with data collection unit 340.

Figure 11:
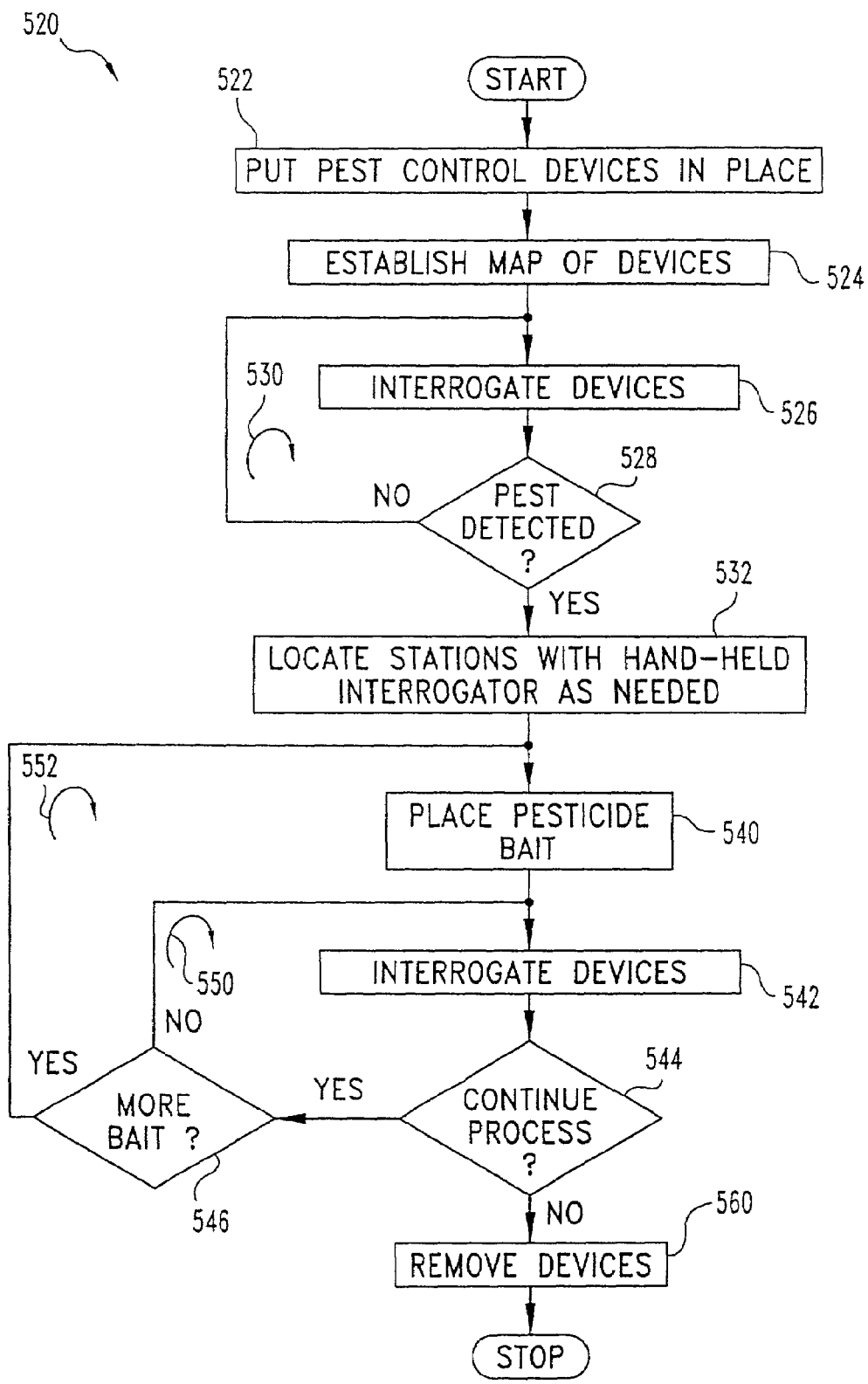
FIG. 11 is a flowchart of one example of a process of the present invention that may be performed with the system of FIG. 9 or FIG. 10.

Referring generally to FIGS. 9 and 10, the flowchart of FIG. 11 depicts termite control process 520 of a further embodiment of the present invention. In stage 522 of process 520, a number of units 310, 410 are installed in and about building 422 as representatively depicted in FIG. 10. In stage 524, a map of devices 310, 410 specific to the device identifiers is established. Monitoring loop 530 is entered with stage 526. In stage 526, vehicle 430 is positioned within a predetermined communication range of the installed units 310, 410. Data collection unit 340 is then activated and sends corresponding commands to each of the installed units 310, 410 and remotely downloads information about each unit at the site. Processor 342 of data collection unit 340 evaluates the information. In accordance with this evaluation, conditional 528 tests whether pests have been detected. If no pests have been detected at conditional 528, loop 530 returns to stage 526 to continue periodic monitoring. Typically, several days or weeks may lapse between the operations of stage 526 for a given site, and the frequency of repetition of loop 530 may vary. Accordingly, vehicle 430 may be moved to other sites to poll other sets of pest detection devices between the periodic checks of stage 526.

If pest activity has been detected at conditional 528, individual devices 310, 410 may be located and interrogated with interrogator 30 in stage 532. Pesticide bait is installed where pest activity is indicated as described in connection with process 220 in stage 540. In stage 542 remote, periodic interrogation resumes with vehicle 430. Conditional 544 is next encountered. Conditional 544 tests if process 520 is to continue. If process 520 is to continue, conditional 546 is encountered. Conditional 546 tests whether more pesticide bait is needed analogous to conditional 246 of process 220. If there is no need for more bait, loop 550 returns to stage 542 to continue remote monitoring of devices 310, 410. If more pesticide bait is needed, then loop 552 returns to stage 540 to place the pesticide bait. As in the case of stage 532, devices 310, 410 may be located and individually interrogated with interrogator 30 when a need for more bait is indicated via conditional 546. Typically, loops 550, 552 are repeated on the order of a few days or weeks with a corresponding interval between performances of stages 540 and 542.

If the test of conditional 544 is negative, devices 310, 410 are located and removed in stage 560. Devices 310, 410 may be located with the aid of interrogator 30 in stage 560. Process 520 then terminates.

It should be appreciated that process 520 facilitates operation of monitoring loops 530 and 550 without requiring the pest control service provider to leave vehicle 430. Indeed, in one alternative embodiment, the interrogation in stages 526, 542 may be performed while vehicle 430 moves by the targeted site, with any need for individual device servicing, such as pesticide bait introduction or replenishment, being determined and scheduled separately.

Figure 12:
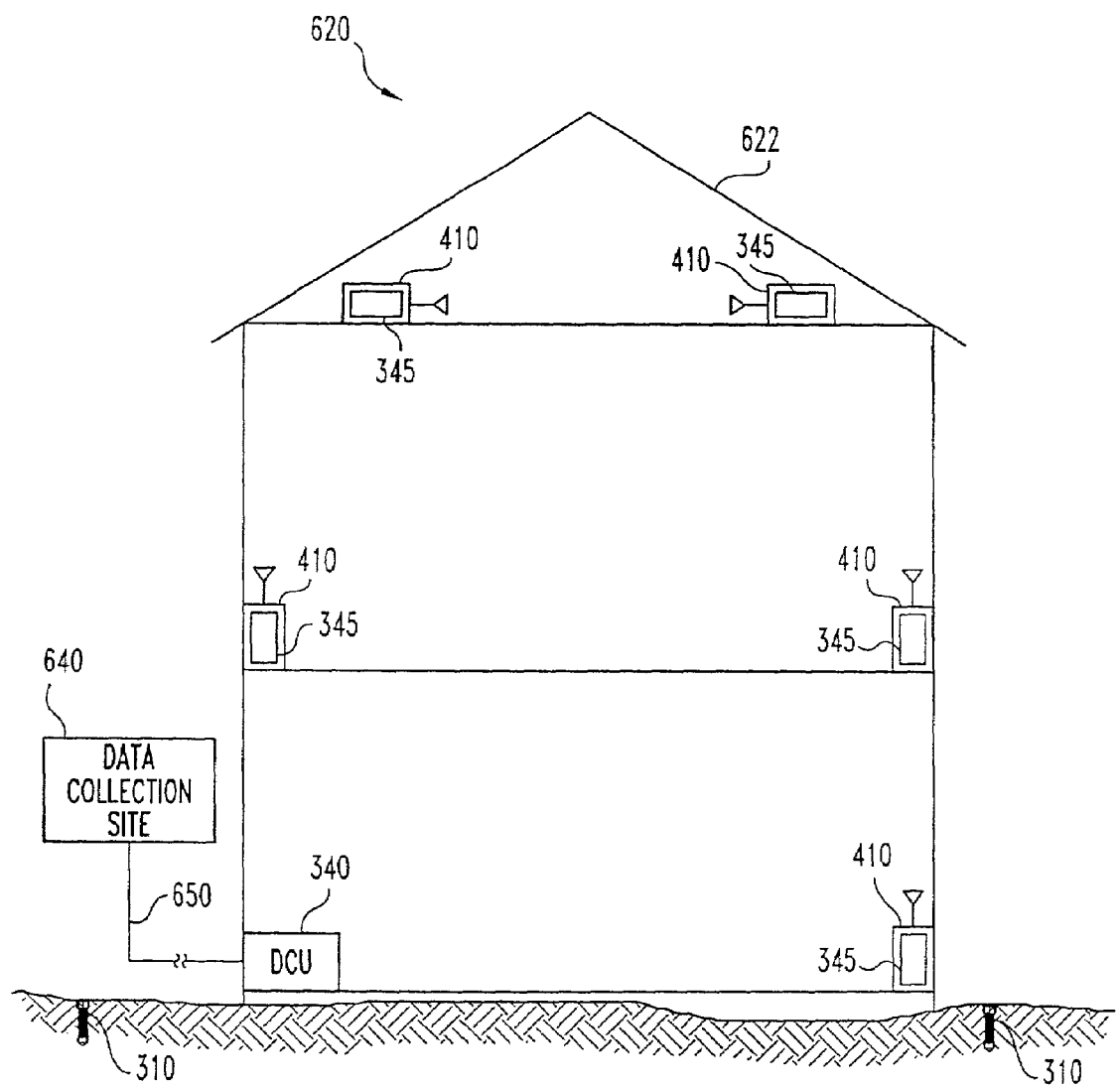
FIG. 12 is a diagram of a fourth type of pest control system according to the present invention.

FIG. 12 depicts system 620 of still a further embodiment of the present invention; where like reference numerals previously described refer to like features. FIG. 12 schematically depicts building 622 of system 620. System 620 also includes devices 310, 410 positioned in selected locations relative to building 622 to protect it from pests. System 620 further includes data collection unit 340 positioned in building 622. Data collection unit 340 is in communication with data collection site 640 via communication channel 650. Channel 650 may be a telephone communication line, a computer network like the internet, or such other communication channel type as would occur to those skilled in the art. System 620 may be operated in accordance with process 220 or 520, to name only a few. The coupling of data control unit 340 to data collection site 640 removes the need for the pest control service provider to travel to perform periodic interrogations of devices 310, 410. Instead, interrogations may be prompted from time to time by an appropriate command sent to data collection unit 340 over channel 650. The results of interrogations may be reported to the data collection site 640 and evaluated to schedule pest control service provider visits only when servicing of individual devices 310, 410 is indicated. If individual service is indicated, the data may be used to determine which devices 310, 410 require attention. If there is difficulty locating devices 310, 410 in need of service, interrogator 30 may be used to determine the position of the targeted devices 310, 410 in the manner described in connection with process 220.

Figure 13:
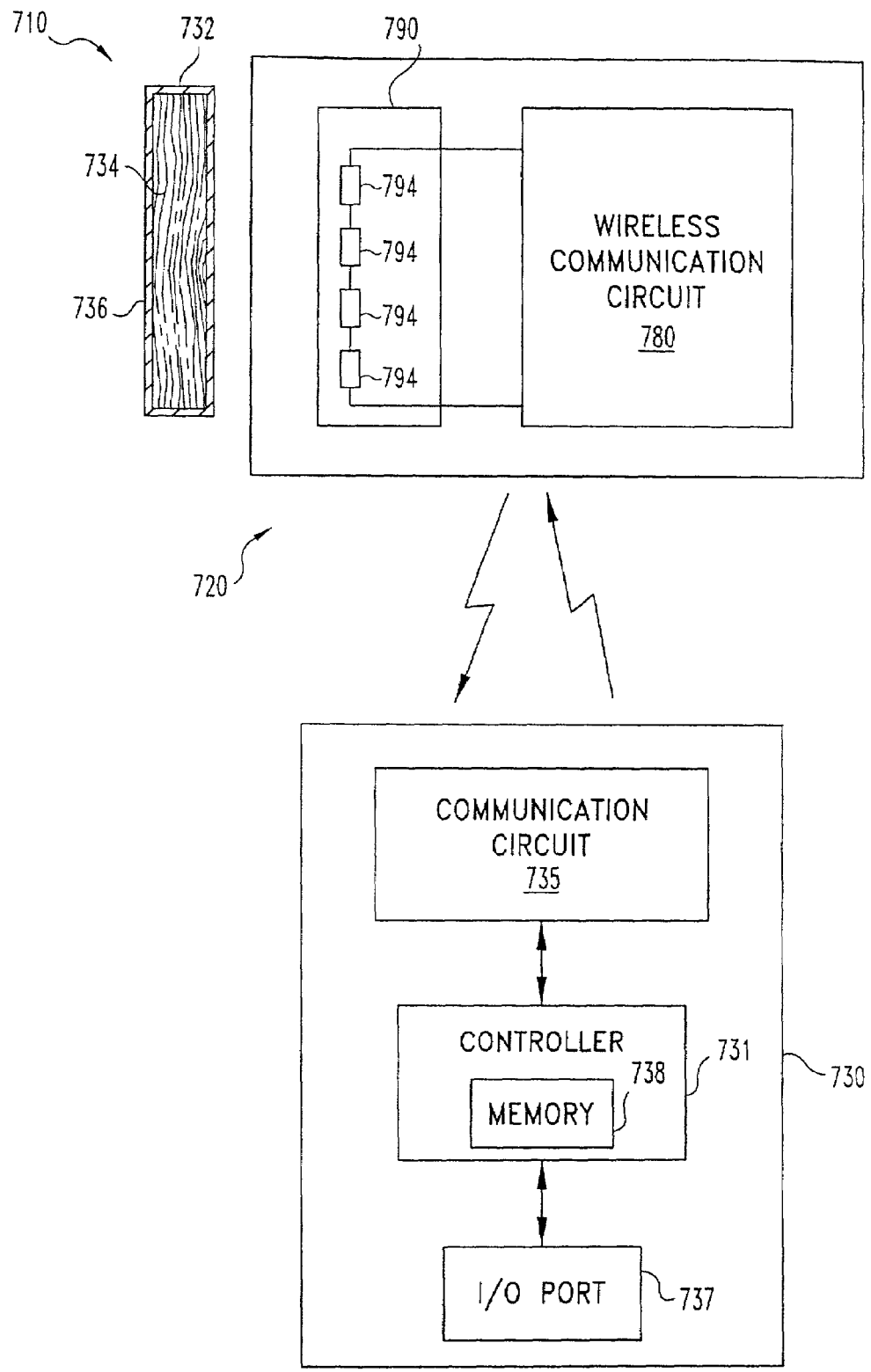
FIG. 13 is a diagram of a fifth type of pest control system including a third type of a pest control device according to the present invention.

FIG. 13 illustrates pest control device system 720 of still another embodiment of the present invention; where like reference numerals refer to like features previously described. System 720 includes interrogator 730 and pest control device 710. Pest control device 710 includes pest monitoring member 732 arranged to be consumed and/or displaced by pests. In one example, member 732 is configured as a bait that includes pest-edible material 734, such as wood in the case of termites, and magnetic material 736 in the form of a coating on material 734. Magnetic material 736 may be a magnetic ink or paint applied to a wood core serving as material 734. In other examples, material 734 may be formed from a substance other than a food source that is typically removed or displaced by the targeted pests—such as a closed cell foam in the case of subterranean termites. In yet other examples, material 734 may be comprised of food and non-food components.

Device 710 further includes wireless communication circuit 780 electrically coupled to magnetic signature sensor 790. Sensor 790 comprises a series of magnetoresistors 794 fixed in a predetermined orientation relative to member 732 to detect a change in resistance resulting from an alteration in the magnetic field produced by magnetic material 736. Such alterations may occur, for instance, as member 732 is consumed, displaced, or otherwise removed from member 732 by pests. Sensor 790 provides a means to characterize a magnetic signature of member 732. In alternative embodiments, sensor 790 may be based on a single magnetoresistor, or an alternative type of magnetic field sensing device such as a Hall effect device or reluctance-based sensing unit.

The magnetic field information from sensor 790 may be transmitted as variable data with communication circuit 780. Circuit 780 may further transmit a unique device identifier and/or discrete bait status information as described for communication circuit 160. Circuit 780, sensor 790, or both may be passive or active in nature.

Interrogator 730 includes communication circuit 735 operable to perform wireless communication with circuit 780 of device 710. In one embodiment, circuits 780 and 790 are of a passive type with circuit 780 being in the form of an RF tag. For this embodiment, communication circuit 735 is configured comparable to circuits 32 and 34 of interrogator 30 to perform wireless communications with device 710. In other embodiments, device 710 may be adapted to include a passive transponder, on board interrogator, and active communication circuit in a manner analogous to device 310 or may be entirely active. For these alternatives, interrogator 730 is correspondingly adapted, a data collection unit may be used in lieu of interrogator 730, or a combination of both approaches may be utilized.

Interrogator 730 includes controller 731, I/O port 737, and memory 738 that are the same as controller 36, I/O ports 37, and memory 38 of interrogator 30, except they are configured to receive, manipulate and store magnetic signature information in addition or as an alternative to discrete bait status and identification information. It should be appreciated that magnetic signature information may be evaluated to characterize pest consumption behavior. This behavior may be used to establish predictions concerning bait replenishment needs and pest feeding patterns.

Figure 14:
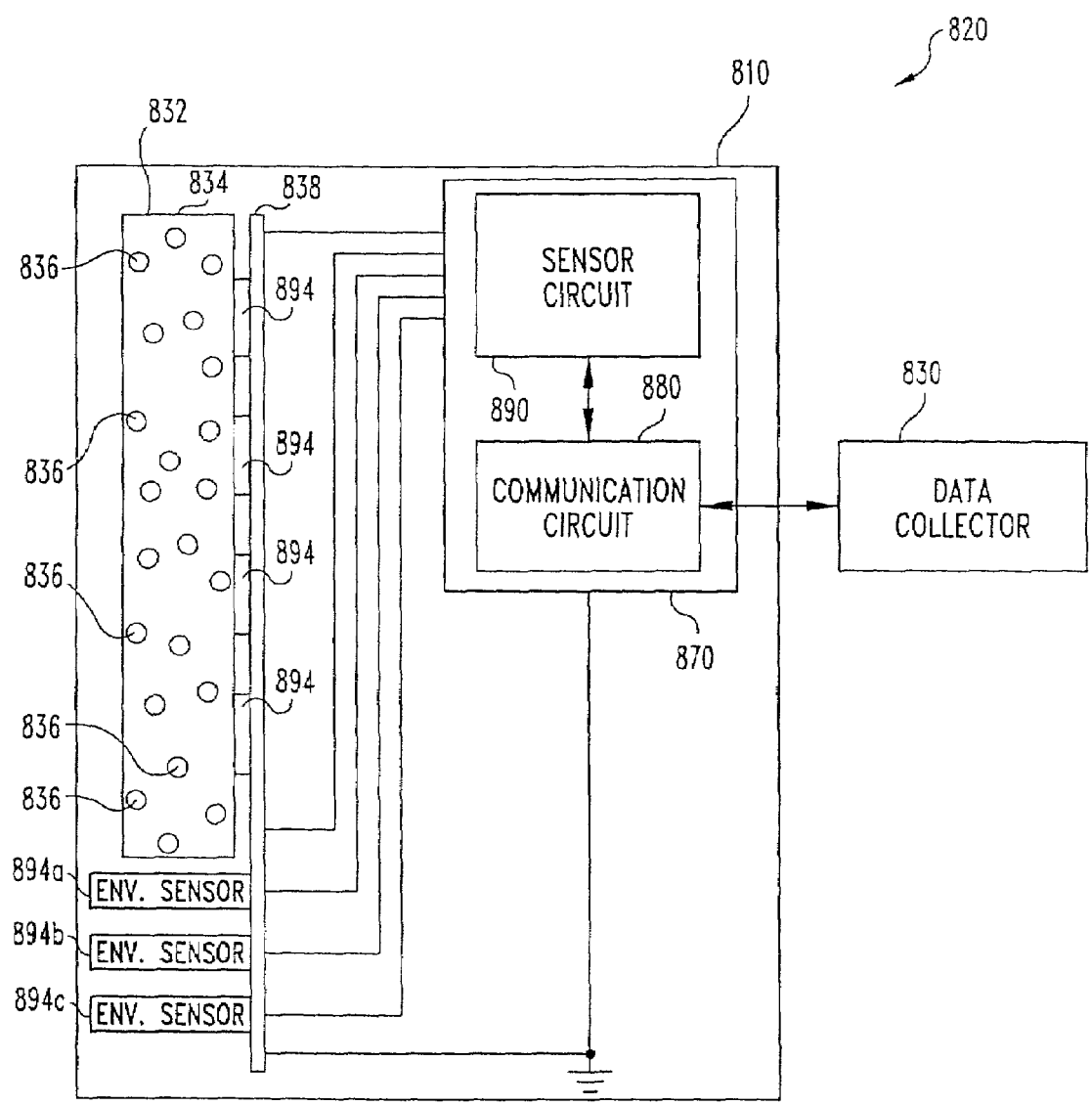
FIG. 14 is a diagram of a sixth type of pest control system including a fourth type of pest control device according to the present invention.

FIG. 14 depicts system 820 of still another embodiment of the present invention. System 820 includes pest control device 810 and data collector 830. Device 810 includes monitoring member 832 arranged to be consumed and/or displaced by the pests of interest. Member 832 includes matrix 834 with a magnetic material 836 dispersed throughout. Material 836 is schematically represented as a number of particles in matrix 834. Matrix 834 may have a food composition, non-food composition, or a combination of these.

Device 810 also includes communication circuit 880 and sensor circuit 890 electrically coupled thereto. Circuit 890 includes a series of magnetoresistors 894 fixed in relation to member 832 to detect change in a magnetic field produced by material 836 as it is consumed, displaced, or otherwise removed from member 832.

Circuit 890 further includes a number of environmental (ENV.) sensors 894a, 894b, 894c configured to detect temperature, humidity, and barometric pressure, respectively. Sensors 894, 894a, 894b, 894c are coupled to substrate 838, and may provide a signal in either a digital or analog format compatible with associated equipment. Correspondingly, circuit 890 is configured to condition and format signals from sensor 894a, 894b, 894c. Also, circuit 890 conditions and formats signals corresponding to the magnetic signature detected with magnetoresistors 894. The sensed information provided by circuit 890 is transmitted by communication circuit 880 to data collector 830. Communication circuit 880 may include discrete bait status information, a device identifier, or both as described in connection with devices 110, 310, 410. Circuit 880 and circuit 890 may each be passive, active, or a combination of both with data collector 830 being correspondingly adapted to the communicate in accordance with the selected approach.

For a passive embodiment of circuit 880 based on RF tag technology, data collector 830 is configured the same as interrogator 30 with the exception that its controller is arranged to manipulate and store the different forms of sensed information provided by circuit 890. In another embodiment, data collector 830 may be in the form of a standard active transmitter/receiver to communicate with an active transmitter/receiver form of circuit 880. In still other embodiments, data collector 830 and device 810 are coupled by a hardwired interface to facilitate data exchange.

Figure 15:
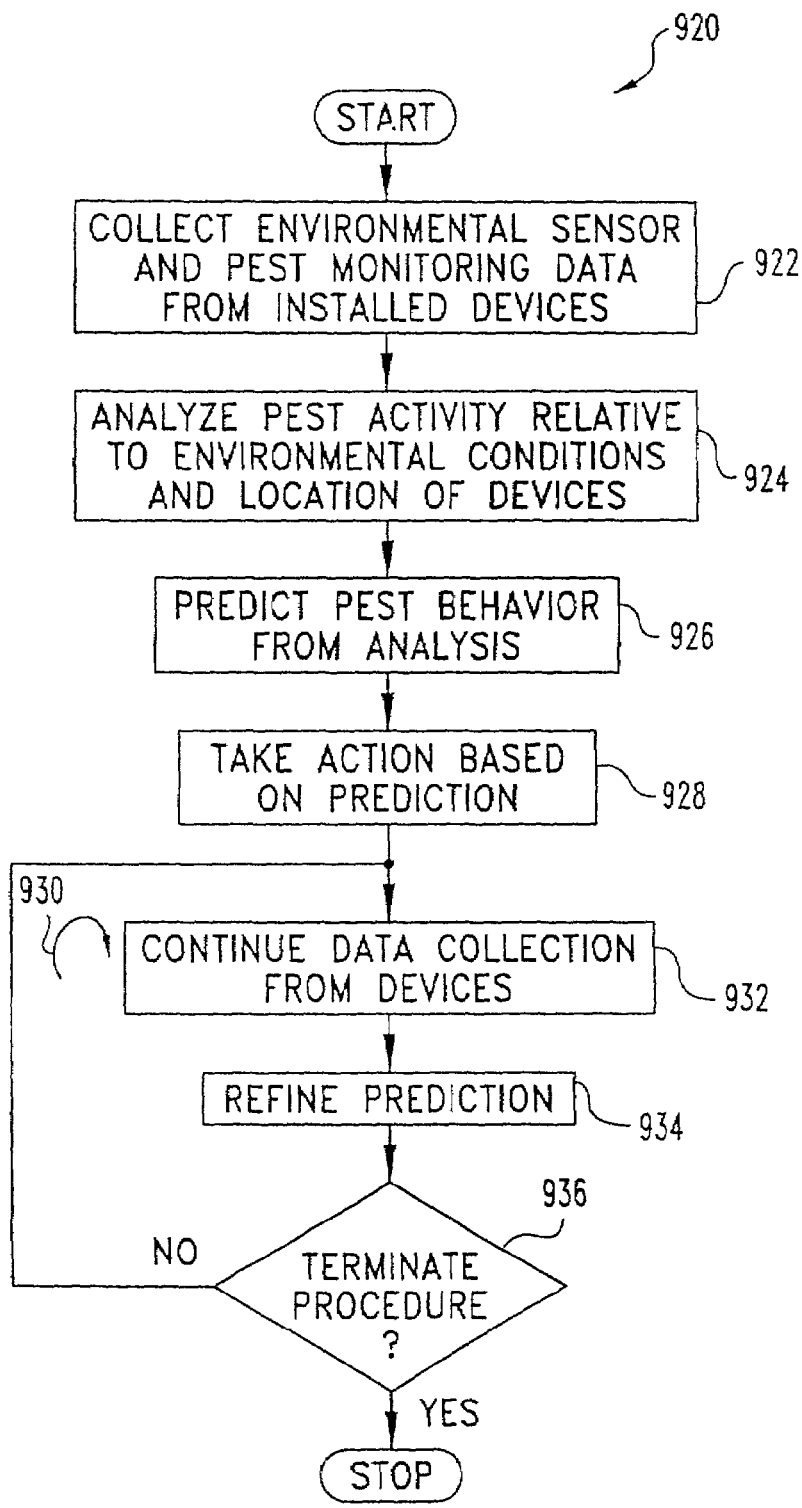
FIG. 15 is a flowchart of one example of a procedure of the present invention that may be performed with the system of FIG. 14.

The flowchart of FIG. 15 depicts procedure 920 of yet another embodiment of the present invention. In stage 922 of process 920, data is collected from one or more devices 810. In stage 924, data gathered from devices 810 is analyzed relative to environmental conditions determined with sensors 894a, 894b, 894c and the location of devices 810. Next, pest behavior is predicted from this analysis in stage 926. In accordance with the predictions of stage 926, action is taken in stage 928 that may include installation of one or more additional devices.

Next, loop 930 is entered with stage 932. In stage 932, data collection from devices 810 continues with data collector 830 and pest behavior predictions are refined in stage 934. Control then flows to conditional 936 that tests whether to continue procedure 920. If procedure 920 is to continue, loop 930 returns to stage 932. If procedure 920 is to terminate in accordance with the test of conditional 936, it then halts.

Examples of other actions that may be additionally or alternatively performed in association with stage 928 include the application of pest behavior patterns to better determine the direction pests may be spreading in a given region. Accordingly, warnings based on this prediction may be provided. Also, advertising and marketing of pest control systems can target sites that, based on procedure 920, are more likely to benefit. Further, this information may be evaluated to determine if the demand for pest control servicing in accordance with one or more embodiments of the present invention seasonally fluctuates. Allocation of pest control resources, such as equipment or personnel, may be adjusted accordingly. Further, the placement efficiency of pest control devices may be enhanced. Also, it should be appreciated that procedure 920 may be alternatively performed with one or more devices 110, 310, 410, 710 in addition to one or more devices 810.

In other alternative embodiments, devices 110, 310, 410, 710, 810 and corresponding interrogators and data collection units may be used in various other system combinations as would occur to one skilled in the art. Also, while bait for devices 110, 310, 410, 710, 810 may be provided in an edible form suitable for termites, a bait variety selected to control a different type of pest, insect or non-insect, may be selected and the device housing and other characteristics adjusted to suit monitoring and extermination of the different type of pest. Moreover, bait for devices 110, 310, 410, 710, 810 may be of a material selected to attract the targeted species of pest that is not substantially consumed by the pest. In one alternative, one or more pest control devices include non-food material that is displaced or altered by targeted pests. By way of nonlimiting example, this type of material may be used to form a non-consumable sensing member substrate with or without consumable bait members. In a further alternative, one or more pest control devices according to the present invention lack a housing, such as housing 170 (and correspondingly cap 180). Instead, for this embodiment the housing contents may be placed directly in the ground or otherwise arranged and utilized as would occur to those skilled in the art. Also, any of the pest control devices of the present invention may be alternatively arranged so that bait consumption or displacement of a sensing member causes movement of a conductor to close an electrically conductive loop as an indication of pest activity instead of causing an open circuit.

Pest control devices based on wireless communication techniques may optionally include hardwired communication ports. Hardwired communication may be used as an alternative to wireless communication for diagnostic purposes, when wireless communication is hampered by local conditions, or as would otherwise occur to those skilled in the art. Moreover processes 220, 520 and procedure 920 may be performed with various stages, operations, and conditionals being resequenced, altered, rearranged, substituted, deleted, duplicated, combined, or added to other processes as would occur to those skilled in the art without departing from the spirit of the present invention.

Another embodiment of the present invention includes a pest control device that comprises at least one bait member for at least one species of pest and a passive RF communication circuit responsive to a wireless stimulation signal to transmit information about the device. In a further embodiment, a number of pest control devices are arranged to be spaced apart from one another in an area to be protected from one or more pests that each include a passive RF communication circuit responsive to a stimulation signal.

Still another embodiment of the present invention includes installing a pest control device at least partially below ground. The device includes a communication circuit and is located after installation by receiving a wireless transmission from the pest control device.

In yet another embodiment, a plurality of pest control devices are installed to protect a building from one or more species of pests that each include a wireless communication circuit. A hand-held interrogator is positioned to receive information from a first one of the pest control devices by wireless transmission and its position is changed to receive information from a second one of the pest control devices by wireless transmission; where the second one of the pest control devices is spaced apart from the first one of the pest control devices. A data collection unit may also be included to receive data from the interrogator.

A further embodiment of the present invention includes a pest control device that has a pest edible bait member with a magnetic material component. This component provides a magnetic field. The field changes in response to consumption of the pest edible bait member. The device further includes a monitoring circuit operable to generate a monitoring signal corresponding to the magnetic field as it changes.

In still a further embodiment, a pest control device includes a bait member for at least one species of pest and a communication circuit that is operable to transmit a device identification code and bait consumption information.

In yet a further embodiment, a pest control device includes a pest bait packaged with an environmental sensor and a circuit operable to communicate information corresponding to an environmental characteristic detected with the sensor and status of the bait.

An additional embodiment of the present invention includes: installing a plurality of pest control devices to protect a building from one or more species of pests that each include a bait and a wireless communication circuit; and interrogating the devices with a wireless communication device that receives a plurality of identification signals each corresponding to a different one of the pest control devices.

All publications, patents, and patent applications cited in this specification are herein incorporated by reference as if each individual publication, patent, or patent application were specifically and individually indicated to be incorporated by reference and set forth in its entirety herein. While the invention has been illustrated and described in detail in the drawings and foregoing description, the same is to be considered as illustrative and not restrictive in character, it being understood that only the preferred embodiment has been shown and described and that all changes, equivalents, and modifications that come within the spirit of the invention defined by following claims are desired to be protected.

What is claimed is:

1. A method, comprising:
installing a plurality of pest control devices each including a wireless communication circuit;
positioning a hand held interrogator to receive information from a first one of the pest control devices by wireless transmission; and
changing position of the hand held interrogator to receive information from a second one of the pest control devices by wireless transmission, the second one of the pest control devices being spaced apart from the first one of the pest control devices;
wherein the information from the first one of the pest control devices includes a pest control device identifier and a bait status indication.

2. The method of claim 1, further comprising transmitting the information from the first one of the pest control devices and the information from the second one of the pest control devices to a data collection unit.

3. The method of claim 1, further comprising repositioning the interrogator to communicate with a third one of the pest control devices.

4. The method of claim 1, wherein the wireless communication circuit of at least one of the pest control devices includes a passive RF transmitter.

5. The method of claim 1, wherein said installing includes placing at least one of the pest control devices at least partially below ground and further comprising locating the pest control devices through wireless communication with the interrogator.

6. The method of claim 1, wherein the first one of the pest control devices is installed with a bait member including a pesticide.

7. A method, comprising:
installing a plurality of pest control devices each including a wireless communication circuit;
positioning a hand held interrogator to receive information from a first one of the pest control devices by wireless transmission;
changing position of the hand held interrogator to receive information from a second one of the pest control devices by wireless transmission, the second one of the pest control devices being spaced apart from the first one of the pest control devices; and
wherein said installing includes placing the first one of the pest control devices at least partially below ground, the first one of the pest control devices being installed with a monitoring bait member for termites, and further comprising:
detecting at least partial consumption of the monitoring bait member from the information about the first one of the pest control devices obtained with the interrogator; and
installing a pesticide bait member for termites in response to said detecting.

8. A method comprising:
installing a plurality of pest control devices each including a wireless communication circuit;
positioning a hand held interrogator to receive information from a first one of the pest control devices by wireless transmission; and
changing position of the hand held interrogator to receive information from a second one of the pest control devices by wireless transmission, the second one of the pest control devices being spaced apart from the first one of the pest control devices;

wherein the pest control devices each include an edible bait member for one or more species of pest, and further comprising evaluating bait status information obtained from each of the pest control devices with the interrogator to identify which of the pest control devices have attracted the one or more species of pest.

9. The method of claim 8, further comprising predicting future behavior of the one or more species of pest from said evaluating.

10. A pest control device, comprising: at least one bait member operable to be consumed or displaced by one or more species of pest and a passive RF communication circuit responsive to a wireless stimulation signal to transmit information about said pest control device, wherein said bait member includes a magnetic material to provide a magnetic signature corresponding to consumption of said bait member by one or more pests.

11. The device of claim 10, further comprising an active RF circuit.

12. The device of claim 10, wherein said passive RF circuit is operable to include a unique identification signal in said information, said identification signal corresponding to a discrete, multibit code assigned to the pest control device.

13. The device of claim 10, further comprising a sensor for measuring a change in at least one of temperature, humidity, or barometric pressure.

14. The device of claim 10, wherein said at least one bait member includes a pesticide.

15. The device of claim 10, wherein said at least one bait member includes a monitoring bait.

16. A combination, comprising: at least two pest control devices each arranged to be spaced apart from one another in an area to be protected from one or more pests, said pest control devices each including a passive RF communication circuit responsive to a stimulation signal, wherein said passive RF communication circuit is operable to provide a different identification signal for each of said pest control devices, at least one of said pest control devices includes a pest sensor operable to provide a status signal indicative of consumption or displacement of a member by the one or more pests, and further comprising an interrogator operable to output said stimulation signal and receive data corresponding to said different identification signal and said status signal in response to said stimulation signal;

wherein said interrogator is in a hand-held form operable to locate each said pest control devices by wireless transmission.

17. The combination of claim 16, further comprising a data collection unit operable to receive said data from said interrogator.

18. A system, comprising:
A plurality of pest control devices, two or more of said pest control devices each including a wireless communication circuit, said devices being arranged for independent installation to protect a selected area from one or more species of pest;
a hand held interrogator operable to establish wireless communication with each of said two or more pest control devices individually, said communication between said interrogator and a respective one of said two or more pest control devices being selectable in accordance with position of said interrogator relative to said two or more pest control devices; and
a data collection unit operable to receive information from said interrogator about one or more of said pest control devices;

wherein said pest control devices each include said wireless communication circuit, a bait member for said one or more species of pest, and an electrically conductive pest detection loop coupled to said wireless communication circuit, said pest detection loop being arranged to be altered by said one or more species of pest to provide a pest detection signal through said wireless communication circuit in response to a signal from said interrogator.

19. The system of claim 18, wherein said wireless communication circuit includes a passive RF transponder energized by a stimulation signal from said interrogator.

20. The system of claim 19, wherein said wireless communication circuit includes an active RF communication circuit.

21. The system of claim 18, wherein at least one of said pest control devices includes an environmental sensor.

22. The system of claim 18, wherein said wireless communication circuit for each of said two or more pest control devices is operable to transmit a different identification signal to uniquely identify each of said two or more pest control devices in response to a signal from said interrogator.

23. A system, comprising: at least one pest control device including a pest sensing member, said member including a magnetic material, said magnetic material providing a magnetic field that changes in response to removal of said magnetic material from said member by one or more pests, said at least one pest control device further including a circuit operable to generate a signal corresponding to said magnetic field.

24. The system of claim 23, wherein said circuit is further configured for wireless communication.

25. The system of claim 24, further comprising a device operable to receive information transmitted by said wireless communication.

26. The system of claim 25, wherein said circuit includes at least one magnetoresistor.

27. The system of claim 23, wherein said pest sensing member is configured as a bait including said magnetic material and said monitoring signal corresponds to a magnetic signature that changes as said bait is consumed.

28. The system of claim 23, wherein said at least one pest control device further includes a sensor to measure at least one of temperature, humidity, and barometric pressure.

29. The system of claim 23, wherein said at least one pest control device is a plurality.

30. A system, comprising: at least one pest control device including a member to sense at least one species of pest and a communication circuit, said communication circuit being operable to transmit a device identification code and pest detection information, wherein said member includes a magnetic material to provide a magnetic signature indicative of a degree of removal of said magnetic material from said member.

31. The system of claim 30, further comprising an interrogator operable to generate a stimulation signal and wherein said communication circuit includes a passive RF transmission circuit responsive to said stimulation signal to transmit said device identification code and said pest detection information.

32. The system of claim 31, further comprising a data collection unit operable to receive data from said interrogator.

33. The system of claim 30, wherein said communication circuit includes an active RF transmitter/receiver.

34. The system of claim 30, wherein said at least one pest control device further includes a sensor to measure at least one of temperature, humidity, and barometric pressure.

35. The system of claim 30, wherein said at least one pest control device is a plurality.

36. A method, comprising:
installing a plurality of pest control devices each including a bait for one or more species of pest and a wireless communication circuit; and
interrogating the pest control devices with a wireless communication device, the wireless communication device receiving a plurality of identification signals each corresponding to a different one of the pest control devices during said interrogating;
wherein the wireless communication circuit is in the form of a hand-held wireless interrogator and includes a passive RF transponder responsive to a stimulation signal from the wireless communication device, the passive RF transponder sending a respective one of the identification signals and a status signal indicative of pest activity.

37. The method of claim 36, further comprising receiving pest activity status information from each of the pest control devices with the wireless communication device.

38. The method of claim 37, further comprising transmitting data to a data collection unit from the wireless communication device.

39. The method of claim 36, further comprising locating each of the pest control devices with the interrogator.

40. The method of claim 36, wherein the pest control devices each include a sensor to measure at least one of temperature, humidity, and barometric pressure.

41. The method of claim 40, further comprising sending data to the wireless communication device from the sensor for each of the pest control devices and comparing the data to pest activity in the pest control devices.

42. The method of claim 41, further comprising predicting pest behavior based on said comparing.

43. The method of claim 36, wherein the bait of each of the pest control devices is selected to be edible by subterranean termites and said installing includes placing at least a portion of the pest control devices at least partially below ground.

44. The method of claim 36, wherein the bait for each of the pest control devices is of a pest activity monitoring variety, and further comprising:
detecting at least partial consumption of the bait for at least one of the pest control devices from data obtained with the interrogator; and
installing a pesticide bait member in response to said detecting.

45. The method of claim 36, wherein the bait includes a pesticide.

46. A method, comprising:
installing a plurality of pest control devices each including a bait for one or more species of pest and a wireless communication circuit; and
interrogating the pest control devices with a wireless communication device, the wireless communication device receiving a plurality of identification signals each corresponding to a different one of the pest control devices during said interrogating;
wherein said bait for at least one of said pest control devices includes a magnetic material operable to provide a magnetic signature corresponding to bait consumption.

47. The method of claim 46, further comprising monitoring said magnetic signature to evaluate pest bait consumption behavior.

* * * * *